US012641031B2

(12) United States Patent
Vaddadi et al.

(10) Patent No.: US 12,641,031 B2
(45) Date of Patent: May 26, 2026

(54) SYSTEM AND METHOD FOR DATA TRANSFER AND REQUEST HANDLING AMONG A PLURALITY OF RESOURCES

(71) Applicants: Praveen Vaddadi, Hyderabad (IN);
Praneeth Vaddadi, Hyderabad (IN)

(72) Inventors: Praveen Vaddadi, Hyderabad (IN);
Praneeth Vaddadi, Hyderabad (IN)

( * ) Notice: Subject to any disclaimer, the term of this patent is extended or adjusted under 35 U.S.C. 154(b) by 262 days.

(21) Appl. No.: 18/213,885

(22) Filed: Jun. 26, 2023

(65) Prior Publication Data

US 2024/0163219 A1 May 16, 2024

(51) Int. Cl.
H04L 47/27 (2022.01)
H04L 47/625 (2022.01)
H04L 49/00 (2022.01)

(52) U.S. Cl.
CPC ............ H04L 47/27 (2013.01); H04L 47/626 (2013.01); H04L 49/3063 (2013.01)

(58) Field of Classification Search
CPC ..... H04L 47/27; H04L 47/626; H04L 47/193; H04L 49/3063
See application file for complete search history.

(56) References Cited

U.S. PATENT DOCUMENTS

| | | | | |
|---|---|---|---|---|
| 4,979,118 A * | 12/1990 | Kheradpir | ................ | H04Q 3/66 |
| | | | | 370/254 |
| 5,870,561 A * | 2/1999 | Jarvis | .................... | H04L 47/781 |
| | | | | 379/221.06 |
| 8,565,117 B2 * | 10/2013 | Hilt | ......................... | H04L 45/64 |
| | | | | 370/254 |
| 2021/0320820 A1 * | 10/2021 | Ruan | ................... | H04L 43/0876 |

* cited by examiner

*Primary Examiner* — Azizul Choudhury

(57) ABSTRACT

A computerized system of main controller that each node uses to process packets comprising: the main controller that each node uses to process packets, wherein the main controller comprises a plurality of receiving threads while receiving or transmitting a plurality of packets, and wherein when packets are received, a payload of the packet is placed per flow into a payload buffer, which notifies a suitable context queue by identifying a connection and a number of bytes received, and wherein the main controller further comprises: a policy controller configured to handle how and when a request for data and computation is performed, relayed, and cached, based on a localized cost estimation procedure, and a mode selector configured to calibrate a sending rate, a transmission window size, and a payload buffer size, based on a given choice complexity parameter that optimizes for a high throughput, a loss avoidance and a low latency.

18 Claims, 24 Drawing Sheets

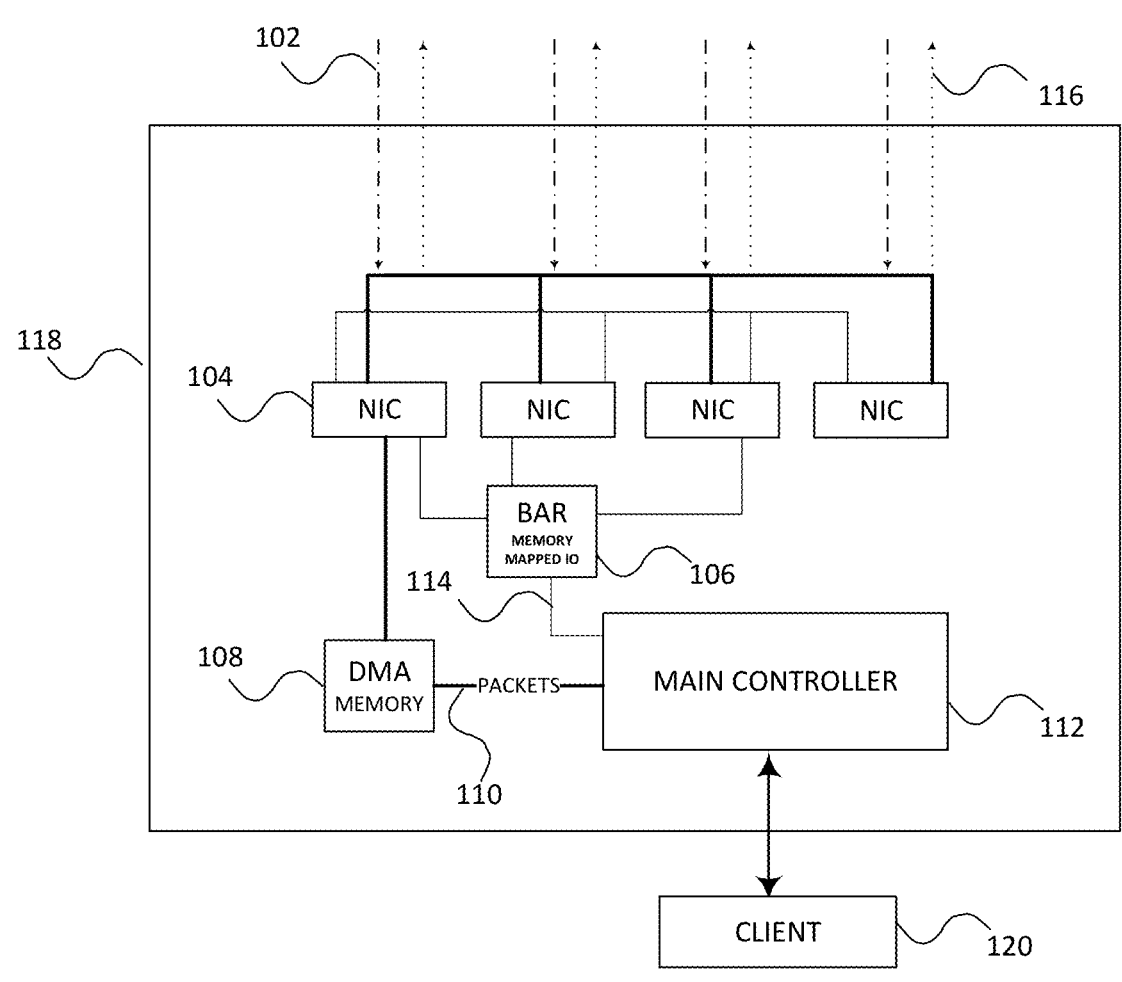
FIGURE 1

600

602

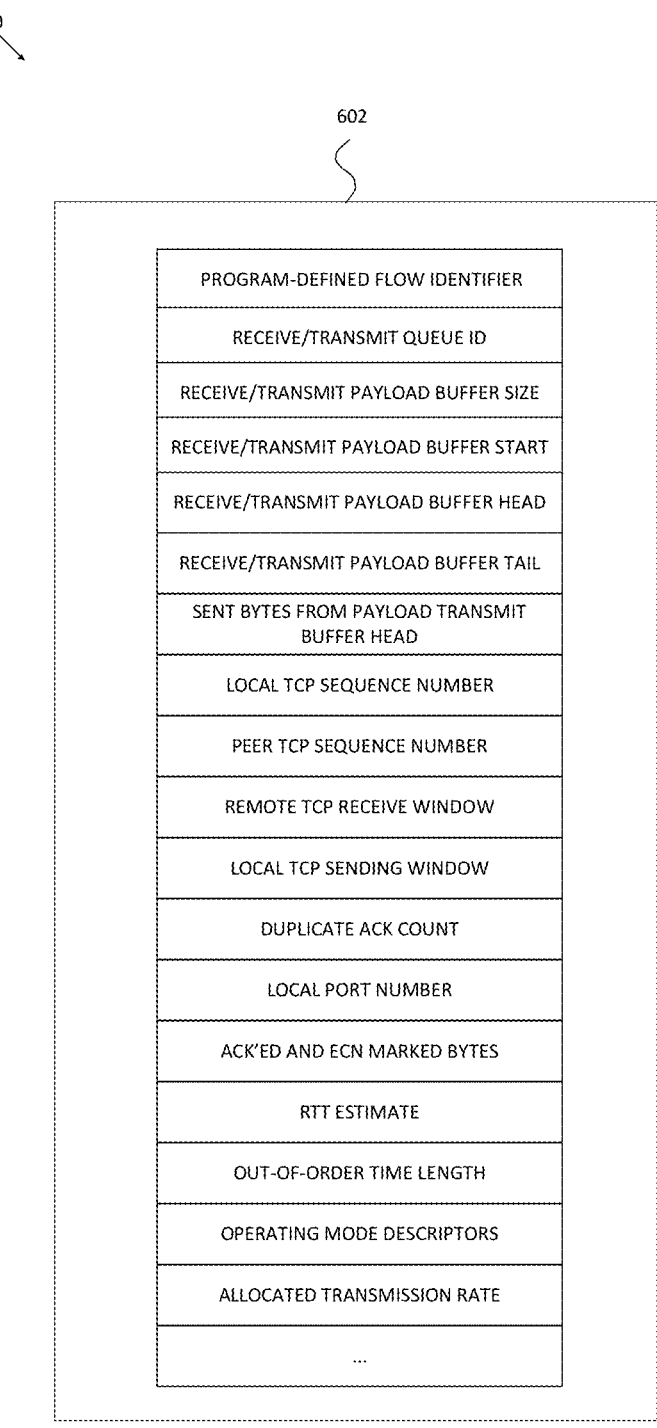

PROGRAM-DEFINED FLOW IDENTIFIER

RECEIVE/TRANSMIT QUEUE ID

RECEIVE/TRANSMIT PAYLOAD BUFFER SIZE

RECEIVE/TRANSMIT PAYLOAD BUFFER START

RECEIVE/TRANSMIT PAYLOAD BUFFER HEAD

RECEIVE/TRANSMIT PAYLOAD BUFFER TAIL

SENT BYTES FROM PAYLOAD TRANSMIT BUFFER HEAD

LOCAL TCP SEQUENCE NUMBER

PEER TCP SEQUENCE NUMBER

REMOTE TCP RECEIVE WINDOW

LOCAL TCP SENDING WINDOW

DUPLICATE ACK COUNT

LOCAL PORT NUMBER

ACK'ED AND ECN MARKED BYTES

RTT ESTIMATE

OUT-OF-ORDER TIME LENGTH

OPERATING MODE DESCRIPTORS

ALLOCATED TRANSMISSION RATE

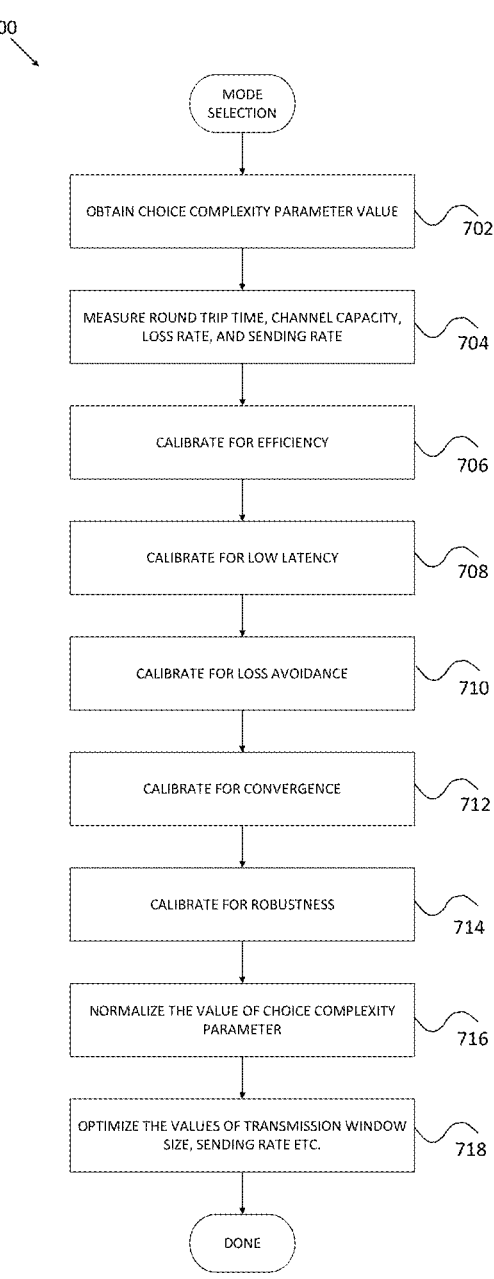

MODE SELECTION

OBTAIN CHOICE COMPLEXITY PARAMETER VALUE — 702

MEASURE ROUND TRIP TIME, CHANNEL CAPACITY, LOSS RATE, AND SENDING RATE — 704

CALIBRATE FOR EFFICIENCY — 706

CALIBRATE FOR LOW LATENCY — 708

CALIBRATE FOR LOSS AVOIDANCE — 710

CALIBRATE FOR CONVERGENCE — 712

CALIBRATE FOR ROBUSTNESS — 714

NORMALIZE THE VALUE OF CHOICE COMPLEXITY PARAMETER — 716

OPTIMIZE THE VALUES OF TRANSMISSION WINDOW SIZE, SENDING RATE ETC. — 718

DONE

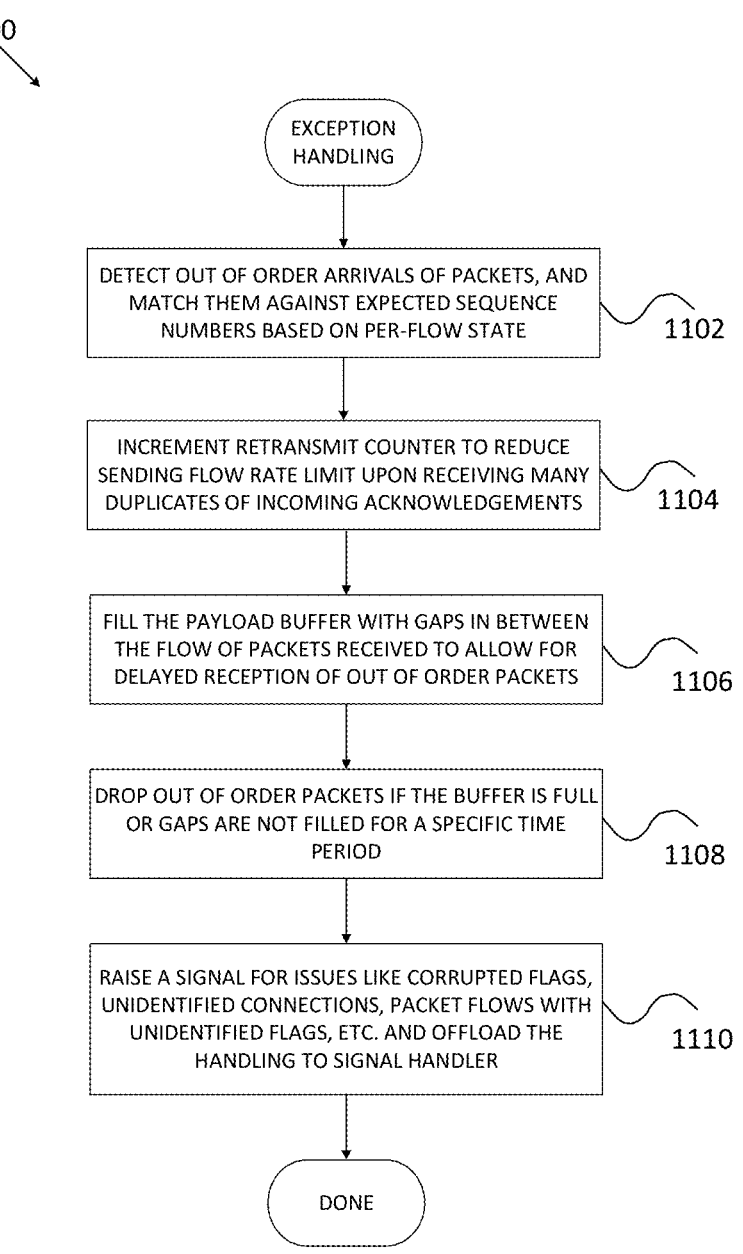

EXCEPTION HANDLING

DETECT OUT OF ORDER ARRIVALS OF PACKETS, AND MATCH THEM AGAINST EXPECTED SEQUENCE NUMBERS BASED ON PER-FLOW STATE     1102

INCREMENT RETRANSMIT COUNTER TO REDUCE SENDING FLOW RATE LIMIT UPON RECEIVING MANY DUPLICATES OF INCOMING ACKNOWLEDGEMENTS     1104

FILL THE PAYLOAD BUFFER WITH GAPS IN BETWEEN THE FLOW OF PACKETS RECEIVED TO ALLOW FOR DELAYED RECEPTION OF OUT OF ORDER PACKETS     1106

DROP OUT OF ORDER PACKETS IF THE BUFFER IS FULL OR GAPS ARE NOT FILLED FOR A SPECIFIC TIME PERIOD     1108

RAISE A SIGNAL FOR ISSUES LIKE CORRUPTED FLAGS, UNIDENTIFIED CONNECTIONS, PACKET FLOWS WITH UNIDENTIFIED FLAGS, ETC. AND OFFLOAD THE HANDLING TO SIGNAL HANDLER     1110

DONE

FIGURE 11

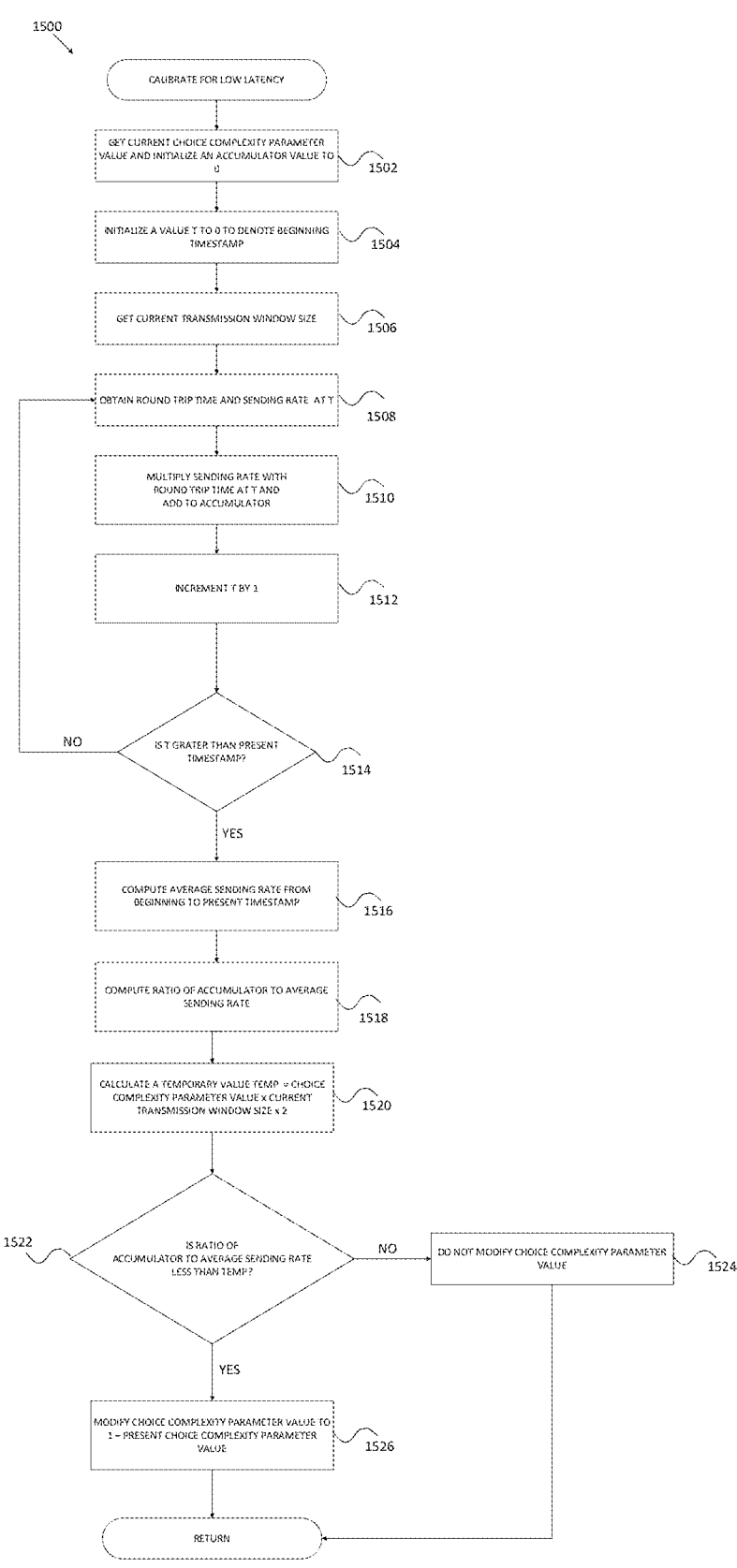

1500

CALIBRATE FOR LOW LATENCY

GET CURRENT CHOICE COMPLEXITY PARAMETER VALUE AND INITIALIZE AN ACCUMULATOR VALUE TO 0 — 1502

INITIALIZE A VALUE T TO 0 TO DENOTE BEGINNING TIMESTAMP — 1504

GET CURRENT TRANSMISSION WINDOW SIZE — 1506

OBTAIN ROUND TRIP TIME AND SENDING RATE AT T — 1508

MULTIPLY SENDING RATE WITH ROUND TRIP TIME AT T AND ADD TO ACCUMULATOR — 1510

INCREMENT T BY 1 — 1512

IS T GRATER THAN PRESENT TIMESTAMP? — 1514

NO

YES

COMPUTE AVERAGE SENDING RATE FROM BEGINNING TO PRESENT TIMESTAMP — 1516

COMPUTE RATIO OF ACCUMULATOR TO AVERAGE SENDING RATE — 1518

CALCULATE A TEMPORARY VALUE TEMP = CHOICE COMPLEXITY PARAMETER VALUE x CURRENT TRANSMISSION WINDOW SIZE x 2 — 1520

IS RATIO OF ACCUMULATOR TO AVERAGE SENDING RATE LESS THAN TEMP? — 1522

NO

DO NOT MODIFY CHOICE COMPLEXITY PARAMETER VALUE — 1524

YES

MODIFY CHOICE COMPLEXITY PARAMETER VALUE TO 1 – PRESENT CHOICE COMPLEXITY PARAMETER VALUE — 1526

RETURN

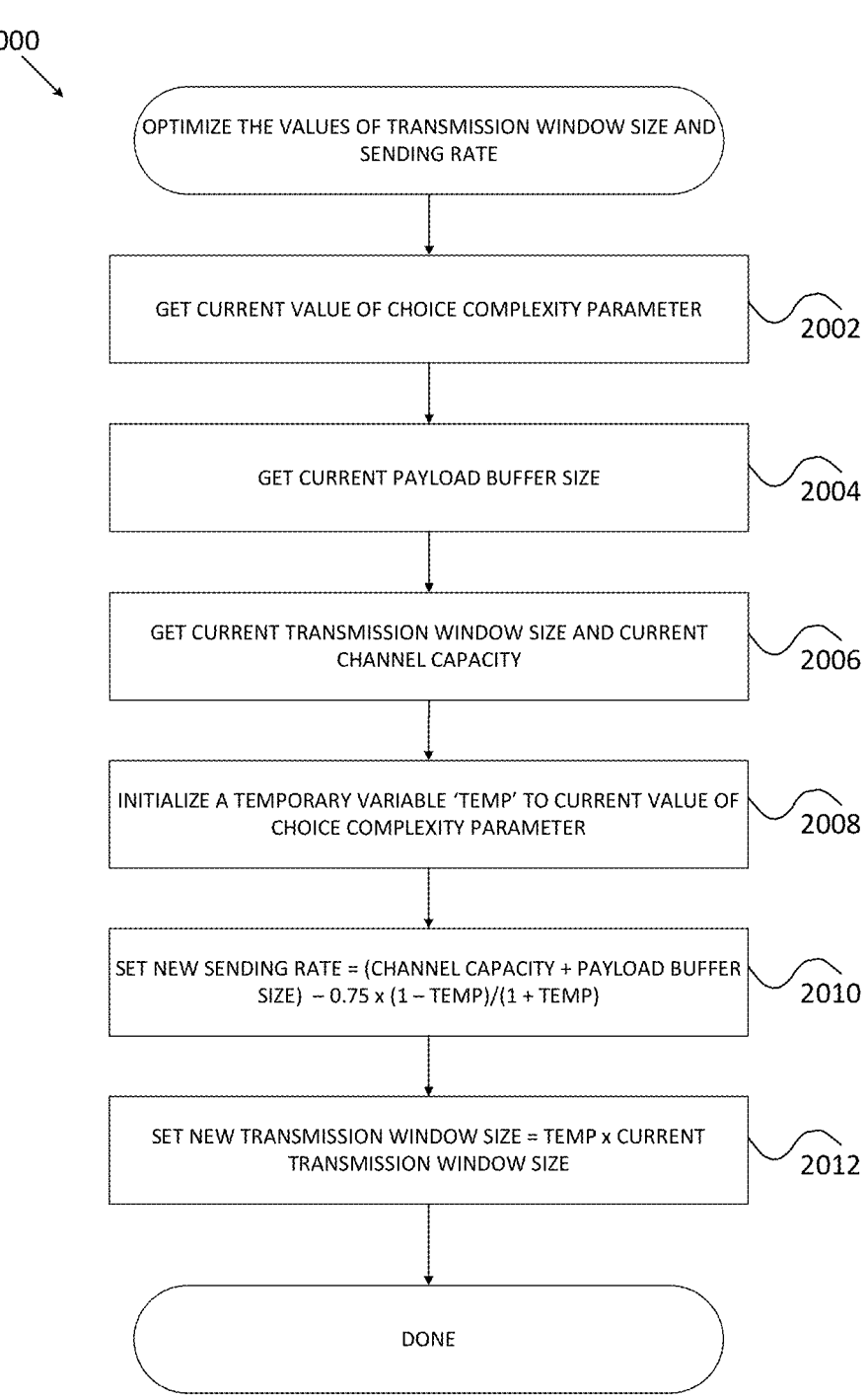

OPTIMIZE THE VALUES OF TRANSMISSION WINDOW SIZE AND SENDING RATE

GET CURRENT VALUE OF CHOICE COMPLEXITY PARAMETER — 2002

GET CURRENT PAYLOAD BUFFER SIZE — 2004

GET CURRENT TRANSMISSION WINDOW SIZE AND CURRENT CHANNEL CAPACITY — 2006

INITIALIZE A TEMPORARY VARIABLE 'TEMP' TO CURRENT VALUE OF CHOICE COMPLEXITY PARAMETER — 2008

SET NEW SENDING RATE = (CHANNEL CAPACITY + PAYLOAD BUFFER SIZE) − 0.75 x (1 − TEMP)/(1 + TEMP) — 2010

SET NEW TRANSMISSION WINDOW SIZE = TEMP x CURRENT TRANSMISSION WINDOW SIZE — 2012

DONE

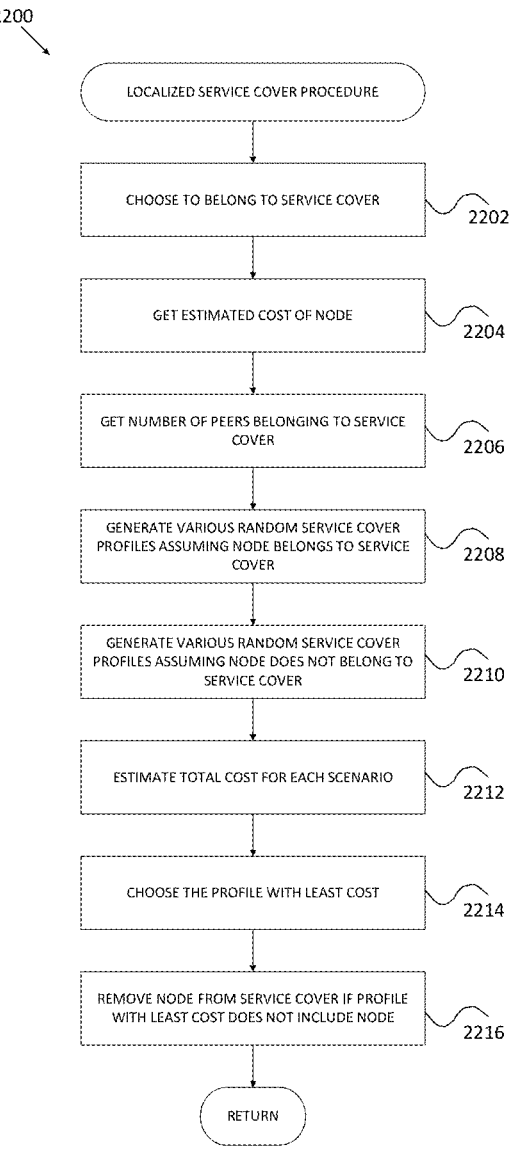

LOCALIZED SERVICE COVER PROCEDURE

CHOOSE TO BELONG TO SERVICE COVER — 2202

GET ESTIMATED COST OF NODE — 2204

GET NUMBER OF PEERS BELONGING TO SERVICE COVER — 2206

GENERATE VARIOUS RANDOM SERVICE COVER PROFILES ASSUMING NODE BELONGS TO SERVICE COVER — 2208

GENERATE VARIOUS RANDOM SERVICE COVER PROFILES ASSUMING NODE DOES NOT BELONG TO SERVICE COVER — 2210

ESTIMATE TOTAL COST FOR EACH SCENARIO — 2212

CHOOSE THE PROFILE WITH LEAST COST — 2214

REMOVE NODE FROM SERVICE COVER IF PROFILE WITH LEAST COST DOES NOT INCLUDE NODE — 2216

RETURN

FIGURE 22

IMPLEMENT COMPONENTS 208 AND 212 AND THEIR OPERATION
2302

IMPLEMENT COMMUNICATION AND DATA CACHING AND RELAYING PROTOCOL ENSURES HIGH AVAILABILITY, ACCESSIBILITY, EQUITABILITY, AND EFFICIENCY AMONG NETWORK RESOURCES
2304

OFFER A GENERALIZED TREATMENT TO DIFFERENT CHOICES MADE FOR SOME COMPONENTS OF THE OPTIMAL DATA PLACEMENT, TRANSFER, AND REQUEST HANDLING PROBLEM
2306

ENABLE A NODE TO INDEPENDENTLY DECIDE WHAT DATA TO CACHE, AND FOR HOW LONG, BASED ON A DYNAMIC ESTIMATE OF CONTENT AND COMPUTE RESOURCE PRESENCE AMONG ITS PEERS
2308

CACHE AND RELAY PACKETS IN A MANNER THAT DOES NOT REQUIRE CALCULATION OF EXPENSIVE FUNCTIONS
2310

LEVERAGE PRINCIPLES FROM GAME THEORY, QUEUING THEORY AND CONTROL THEORY TO FORMULATE AN ELEGANT SOLUTION TO A DIFFICULT PROBLEM
2312

AUTOMATICALLY CREATE CONTENT AND COMPUTE DIVERSITY TO AVOID FLOODING THE NETWORK WITH MESSAGES
2314

ENABLE NODES TO OFFLOAD VARIOUS COMPUTATIONS INVOLVED IN THE METHOD TO DEDICATED HARDWARE, EXECUTED IN USER-SPACE OR OS KERNEL BYPASS MODULES
2316

SYSTEM AND METHOD FOR DATA TRANSFER AND REQUEST HANDLING AMONG A PLURALITY OF RESOURCES

PRIORITY CLAIM

This application claims priority under Article 4A of the Paris Convention for the Protection of Industrial Property to Indian Patent Application No. 202241064590, filed on Nov. 11, 2022 and titled "SYSTEM AND METHOD FOR DATA TRANSFER AND REQUEST HANDLING AMONG A PLURALITY OF RESOURCES".

FIELD OF INVENTION

The present invention generally relates to data communications, and more particularly, to an optimized means of network-based request distribution and data transfer. The invention further relates to network resource allocation and achieving optimal performance, stability, and fairness in networking systems.

BACKGROUND

The cloud's low cost of operation has enabled various computation, networking, and storage resources to be distributed across various hierarchical levels (from the General purpose CPU or GPU core of the network to the edge). With increasing requirements from delay-sensitive applications (such as smart transportation and intelligent car systems, in-network multimedia processing, medical and financial data analytics, etc.) for low-latency and high throughput computational and data transmission services, a distributed implementation and control architecture optimally utilizing storage, bandwidth and computational resources is necessary.

Specifically, this invention is a novel method providing a solution to multi-objective design problem of (i) how should one handle information and computation requests (ii) how to efficiently store and move data between electrical devices, or nodes, or servers over a network system, or the internet.

For instance, at each networked node or server (or linker or router), the data and computation requests may arrive in a dynamic and time-varying fashion. Due to the delays in the propagation of information and the difficulty in defining network dynamics under arbitrary traffic patterns, it is very difficult to optimize (and stabilize) the general transmission and placement decision process for data and computation requests.

Historically, approaches to addressing issues of optimizing request handling, computational processing, and data transmission, without overloading routers, or links, or nodes, or servers have involved mitigating the problem using various load balancing, congestion control, data replication and relaying strategies. A decision regarding the replication of data and the processing of computation requests can only be made based on the local information that is available at each node (or server) at the present time and the approximate information about the future state of the network.

A set of links and/or routers getting overloaded, or a part of a network getting swamped or a set of servers or nodes getting overloaded cause delays in information processing and data transmission speeds. Most of the time, one can lead to the other, partly because network software retransmits requests and data packets (or flows) that go unresolved for an extended period of time.

This effectively translates to a predictor or controller component in nodes, servers or routers (i) measuring or estimating the amount of bandwidth and available processing power, (ii) tuning the packet (or flow) sending rate, (iii) dynamically optimizing request and data routing, relaying and caching (iii) dealing with data (packets or flows) loss or corruption due to congestion, or non-congestion related problems by reducing the amount of data needed to be retransmitted, (iv) not overloading the routers or linkers, and (v) being friendly to other transmission protocols (TCP or others).

Operating in an increasingly diverse range of application environments such as ad hoc networks, IoT, telecommunication networks with large number of devices joining and retiring from the network, and the overwhelmingly large design space (request handling, data routing, replicating and relaying, and interoperability with various data transmission protocols) mark the need for a method that provides an easy means to tune sending rate exactly to the instantaneous capacity of the channel, optimally cache, route and relay data and requests among nodes or servers, and vary as other traffic from other transmission protocols begins and ends.

A few aspects of the basic problem have been addressed separately in the prior art, but the problem has not yet been solved in its entirety. The invention provides a solution to the combined problem of optimal request handling, computation, data replication and relaying, fairness among competing flows, as well as friendliness to other transmission protocols in the network.

Prior art has generally focused on designing controllers and protocols with the aim of maximizing network utility, minimizing network hops to retrieve data, achieving rapid sending rate stability, minimizing processing and network queue loads, etc., rather than exploring the inherent derivations and trade-offs between desired properties. They fail to consider interactions between different components such as flow control and batching, scheduling, caching, subnetwork (regional) accessibility and utility maximization, congestion control, backpressure, etc. This problem is compounded by the heterogeneity of operational settings such as wireless, inter and intra-data centers, satellite, radio, etc., for various application loads.

Prior art methodologies fail to embody the joint network multiplier effects; locational access patterns; data processing, placement, and movement overheads; congestion control; etc., in their dynamic modelling frameworks or multi-objective optimization models.

Prior art schemes cannot model the inherent trade-offs between various desiderata such as, inter alia:

Relaying and caching control achieving high data availability vs. achieving low latency and congestion or non-congestion-based loss avoidance, Managing small vs. large traffic demands, compounded by a large mix of short-lived and long-lived flows, Maximizing for cache utilization vs. fairness to other competing flows Fast utilization of spare network bandwidth vs. TCP-friendliness, Maximizing for regional (locational) availability vs. long distance multi-hop avoidance and fast convergence to stable sending rate, Achieving high data relaying and caching performance vs. being compatible with legacy TCP protocols, Achieving high computational throughput vs. maintaining low latency in dynamic network environments, Being resilient to non-congestion loss versus not incurring high loss upon convergence, and in the manner of the present invention, whether proactive or reactive, in a fully distributed manner. They continue to prioritize optimizing a single objective, in a centralized way, at the expense of other desirable characteristics.

Accordingly, there is a need for distributed dynamic input-output model having an iterative equilibrium solution, the complex relationships between the components affecting the behaviors of various criteria are represented. There is a need for novel techniques for placement and transmission control of data packets in a network, at a continually revised optimal rate that has been precomputed by nodes simultaneously, completely acting based only on their local information. In this way, the new methods provided herein differs from the prior art's network utility maximization technique.

Furthermore, The evolution of internet architecture from a client-server communication model to a content-centric communication model reflects how the internet is used in the present day. It primarily serves information-centric applications such as Content Distribution Networks (CDN), Peer-to-Peer Networks (P2P), Video on Demand, IoT, etc. Due to the increasing demand for scalable and efficient distribution of content, the TCP/IP architecture has demonstrated some weaknesses in delivering delay-sensitive traffic.

The end-to-end feedback method used by traditional TCP results in a performance reduction of the system, which is mostly caused by the delay and bandwidth usage of the feedback. The rate control mechanism of TCP lowers the transmission rate and initiates an end-to-end retransmission of the lost packet. TCP was initially created for wired networks, where congestion is the main cause of packet loss. Other wireless communications-related causes of packet loss cannot be addressed by reducing the transmission rate. Sophisticated transmission systems like ASPERA® FASP™, UDT, and LEDBAT offer protocols to address the issue of reliable and quick bulk data transfer between nodes. Rather than depending on frequent back-and-forth communication between the sending and receiving nodes to control congestion and reliability, the receiving node reports a stream of transit time samples to the sending node, which is fed into its predictor, to control sending rate. Such prior art techniques are TCP friendly, robust to congestion and non-congestion-based losses, etc., and better suited for low latency end-to-end bulk data transfer requirements.

There have been several architectures proposed for information centric networking (ICN), where content distribution is of primary focus rather than communication among specific nodes. Some of these architectures include PSIRP, DONA, TRIAD, and Content Centric Networking (CCN). The infrastructure of CCN decouples the location from network to accelerate content delivery, thus allowing any element in the network to store content temporarily acting as servers. As end users obtain content directly by their names rather than their locations, name-based relaying and content caching are major aspects of the CCN operation.

Although routers are aware of the boundaries between components in a name, they do not know the meaning of a name. Each application chooses a naming scheme it deems fit and allows the naming scheme to evolve independently from the network. A hierarchical naming structure is assumed in CCN, for example, a file produced by example-.com may have the name/example/3DAssets/file.3d.

Several prior art schemes like offer efficient cache and compute request placement, relaying, and flow control strategies for CCN. Such schemes optimize for computation, data queue stabilization and throughput. However, the computational overhead on each node to process multiple objective functions is very high. They also discount significant latency and overhead costs incurred during bandwidth estimation, estimating the computational load of an interest (e.g. request) packet, retransmission due to non-congestion-based losses, etc.

Additionally, problems regarding interoperability with transport layer protocols (e.g. TCP friendliness), fairness towards competing transmission flows of other protocols, and rapid usage of free network resources remain unsolved. In addition, they leave unanswered the issue of handling a large number of concurrent flows to maximize aggregate traffic intensity by disregarding various overheads arising from interactions between components such as overhead of matching incoming packet to its flow, overhead of scheduling and ensuring fair queuing, CPU overhead due to admission control and context switching between flows at high frequencies, which may result in reduced throughput and negative cascading effects in a dynamic network. These prior art techniques providing combined computation, caching, and relaying policies primarily optimize for equitability or efficiency, leaving out accessibility.

In actuality, the only consistent approach to cope with all degrees of inefficiency, network underutilization and topological variations, data losses, suboptimal data placement, unfairness toward competing flows, TCP-unfriendliness, and excessive latencies is to model a dynamic interaction model that takes a choice complexity trade-off parameter.

SUMMARY OF THE INVENTION

A computerized system of main controller that each node uses to process packets comprising: the main controller that each node uses to process packets, wherein the main controller comprises a plurality of receiving threads while receiving or transmitting a plurality of packets, and wherein when packets are received, a payload of the packet is placed per flow into a payload buffer, which notifies a suitable context queue by identifying a connection and a number of bytes received, and wherein the main controller further comprises: a policy controller configured to handle how and when a request for data and computation is performed, relayed, and cached, based on a localized cost estimation procedure, and a mode selector configured to calibrate a sending rate, a transmission window size, and a payload buffer size, based on a given choice complexity parameter that optimizes for a high throughput, a loss avoidance and a low latency.

BRIEF DESCRIPTION OF THE DRAWINGS

The present application can be best understood by reference to the following description taken in conjunction with the accompanying figures, in which like parts may be referred to by like numerals.

FIG. 1 is a schematic illustration of a node in a network, according to some embodiments.

5

FIG. 6 is an exemplary schematic of per-connection state information maintained by a node, according to some embodiments.

FIG. 7 is a flowchart illustrating an exemplary operation of a subcomponent for mode selection by a node, according to some embodiments.

Figure 8:
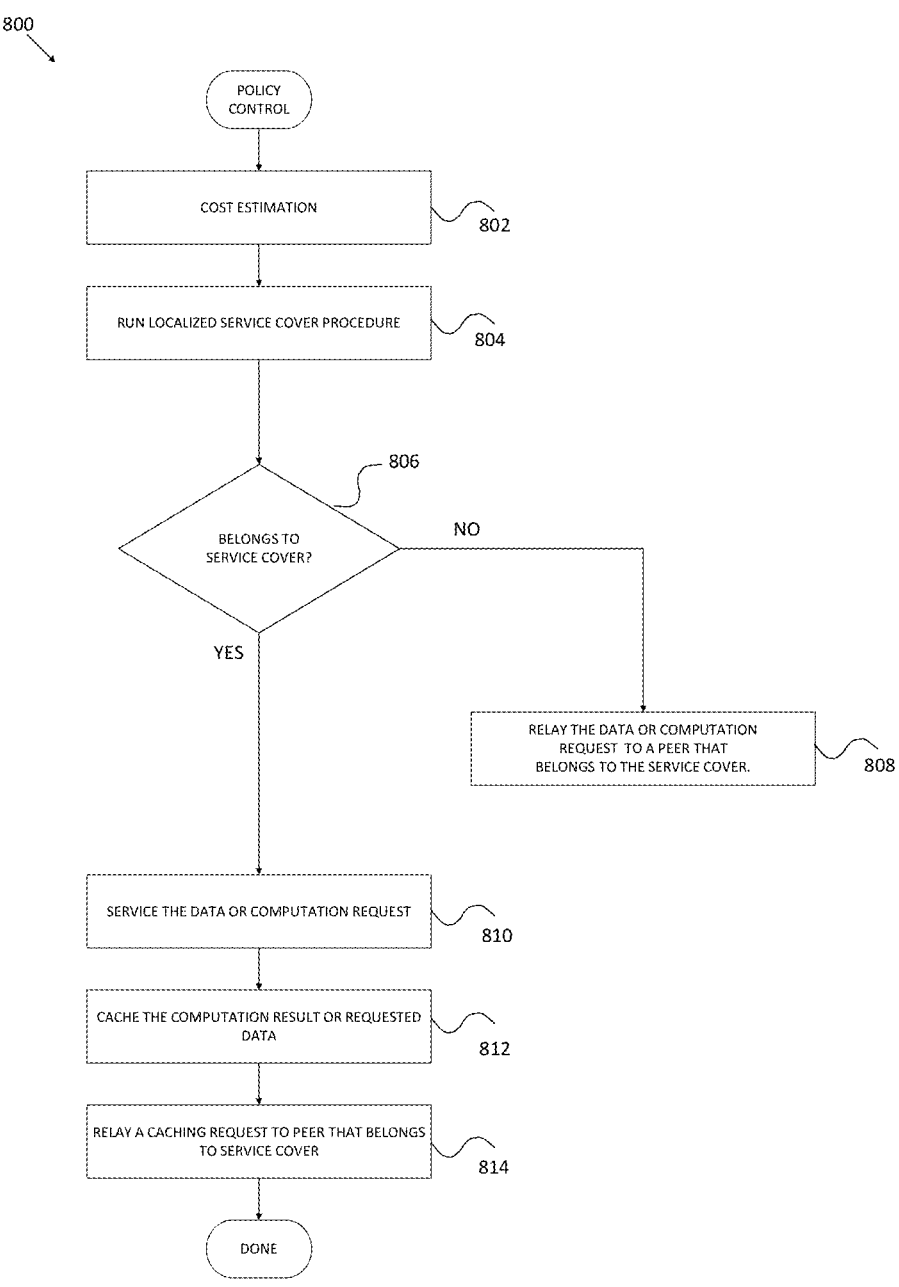

FIG. 8 is a flowchart illustrating an exemplary operation of a subcomponent for policy control by a node, according to some embodiments.

Figure 9:
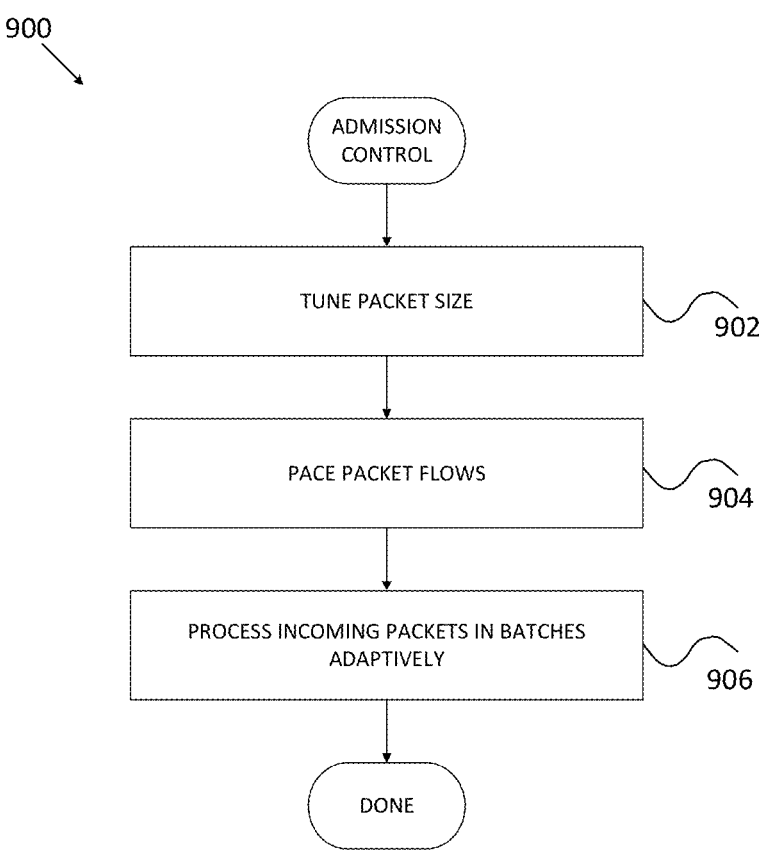

FIG. 9 is a flowchart illustrating an exemplary operation of a subcomponent for admission control by a node, according to some embodiments.

Figure 10:
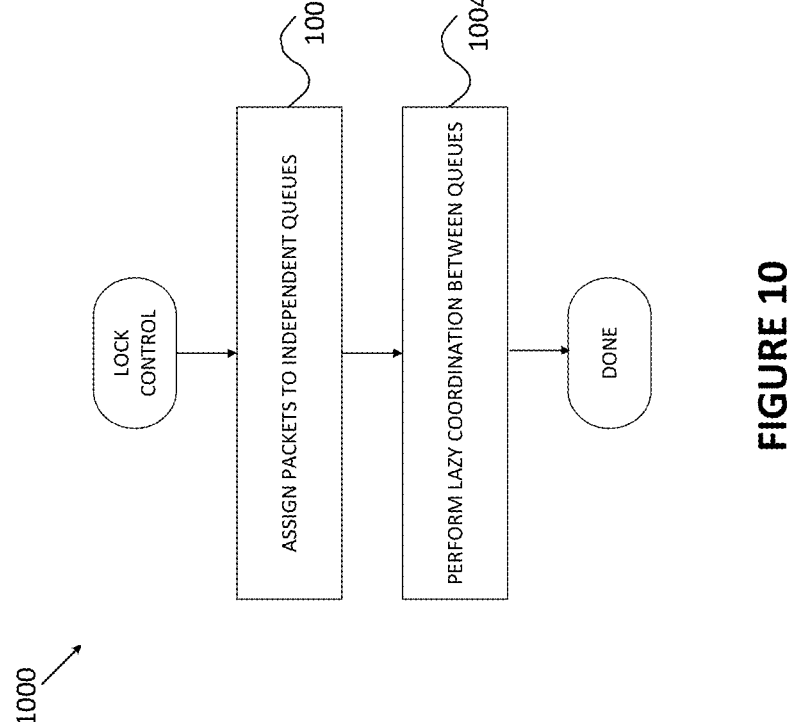

FIG. 10 is a flowchart illustrating an exemplary operation of a subcomponent for lock control by a node, according to some embodiments.

FIG. 11 is a flowchart illustrating an exemplary operation of a subcomponent for exception handling by a node, according to some embodiments.

Figure 12:
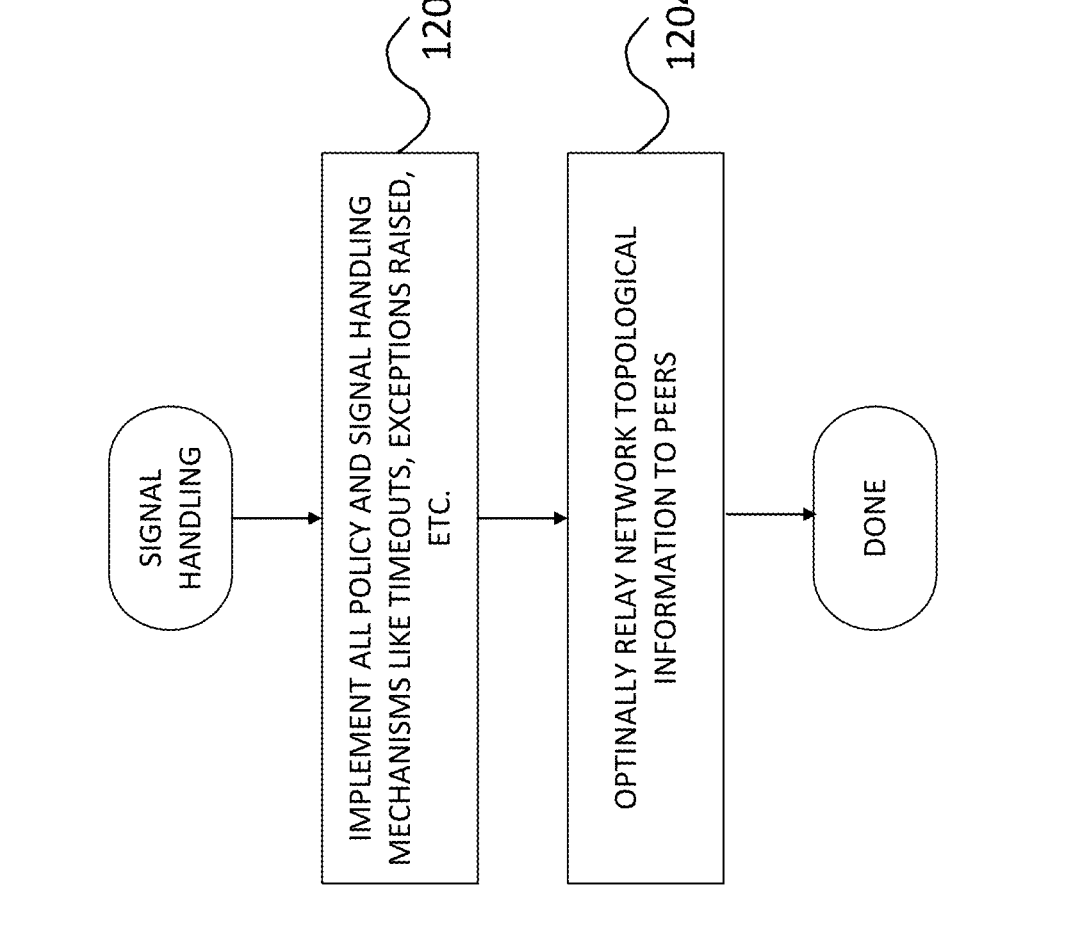

FIG. 12 is a flowchart illustrating an exemplary operation of a subcomponent for signal handling by a node, according to some embodiments.

Figure 13:
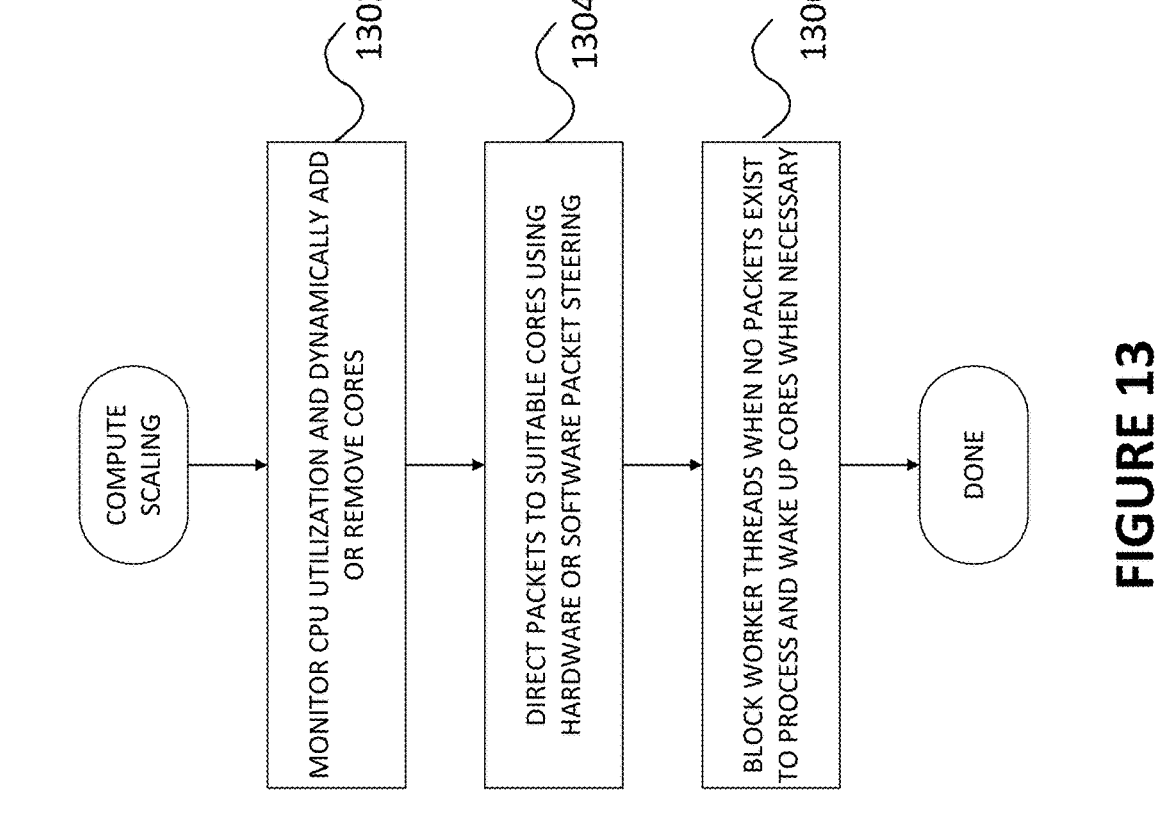

FIG. 13 is a flowchart illustrating an exemplary operation of a subcomponent for compute scaling by a node, according to some embodiments.

Figure 14:
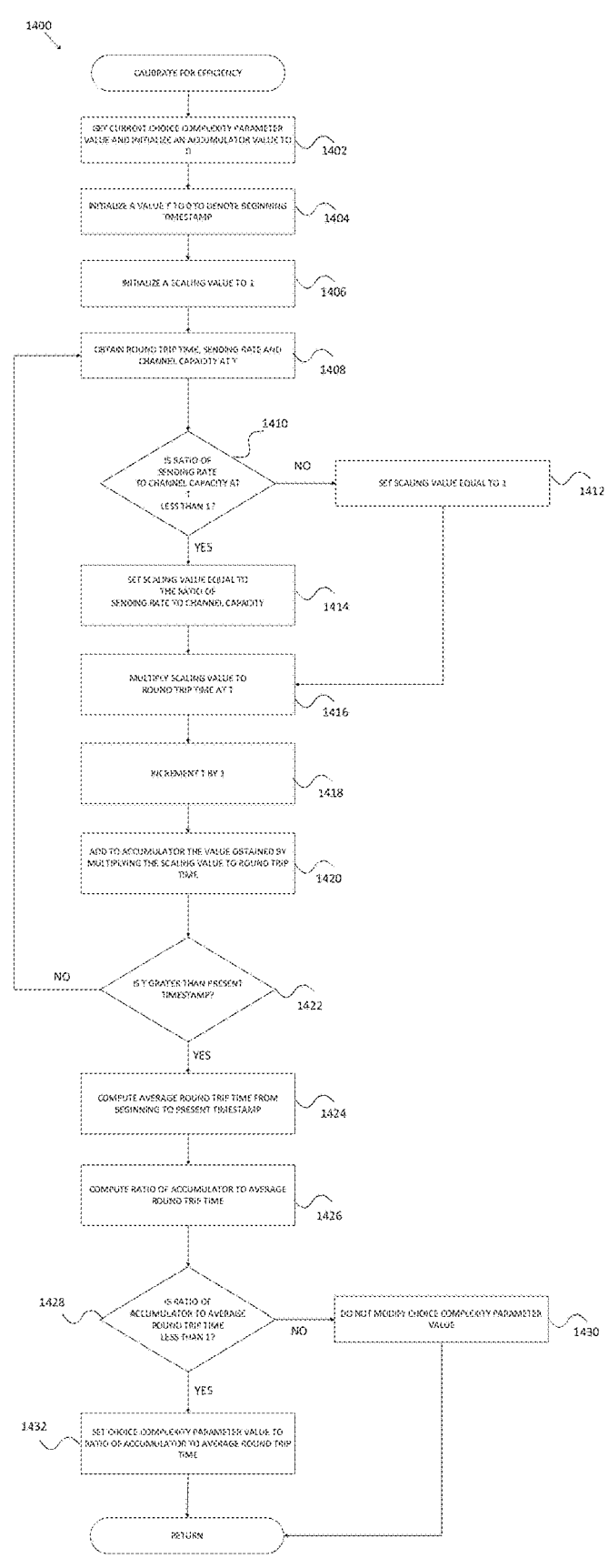

FIG. 14 is a flowchart illustrating an exemplary operation of a subcomponent for calibrating for efficiency by a node, according to some embodiments.

FIG. 15 is a flowchart illustrating an exemplary operation of a subcomponent for calibrating for low latency by a node, according to some embodiments.

Figure 16:
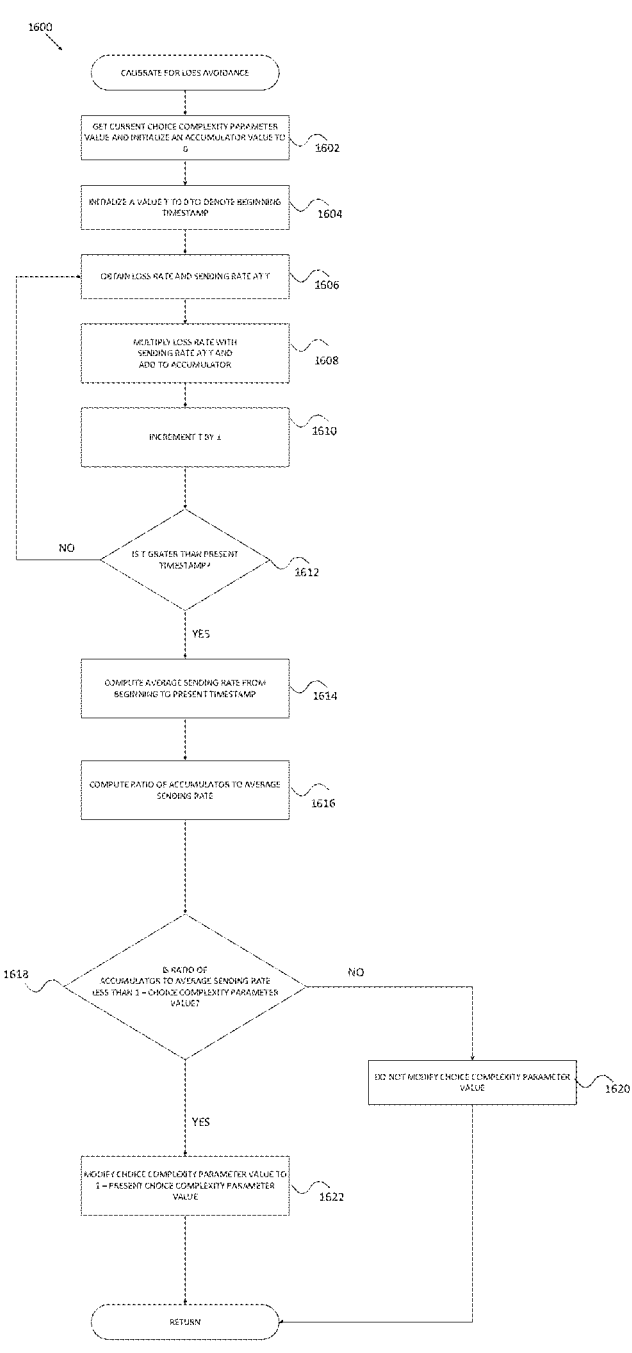

FIG. 16 is a flowchart illustrating an exemplary operation of a subcomponent for calibrating for loss minimization by a node, according to some embodiments.

Figure 17:
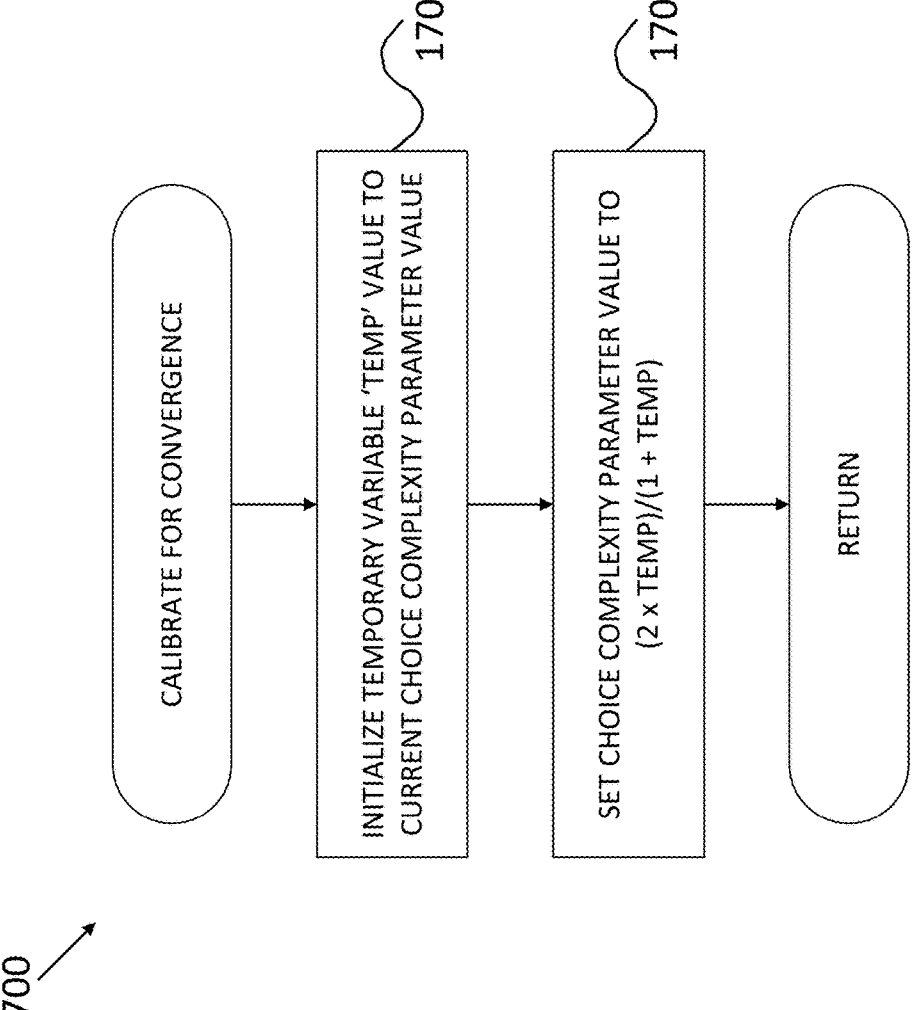

FIG. 17 is a flowchart illustrating an exemplary operation of a subcomponent for calibrating for quick convergence by a node.

Figure 18:
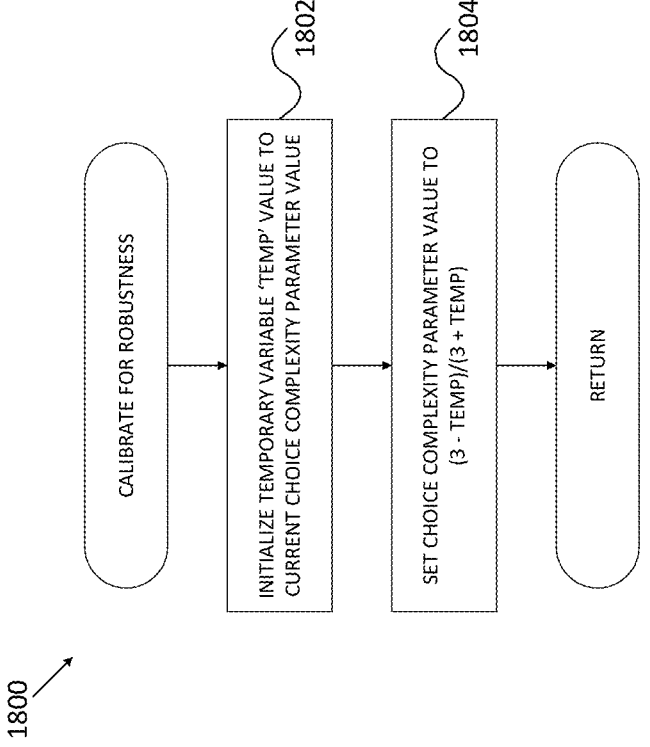

FIG. 18 is a flowchart illustrating an exemplary operation of a subcomponent for calibrating robustness by a node, according to some embodiments.

Figure 19:
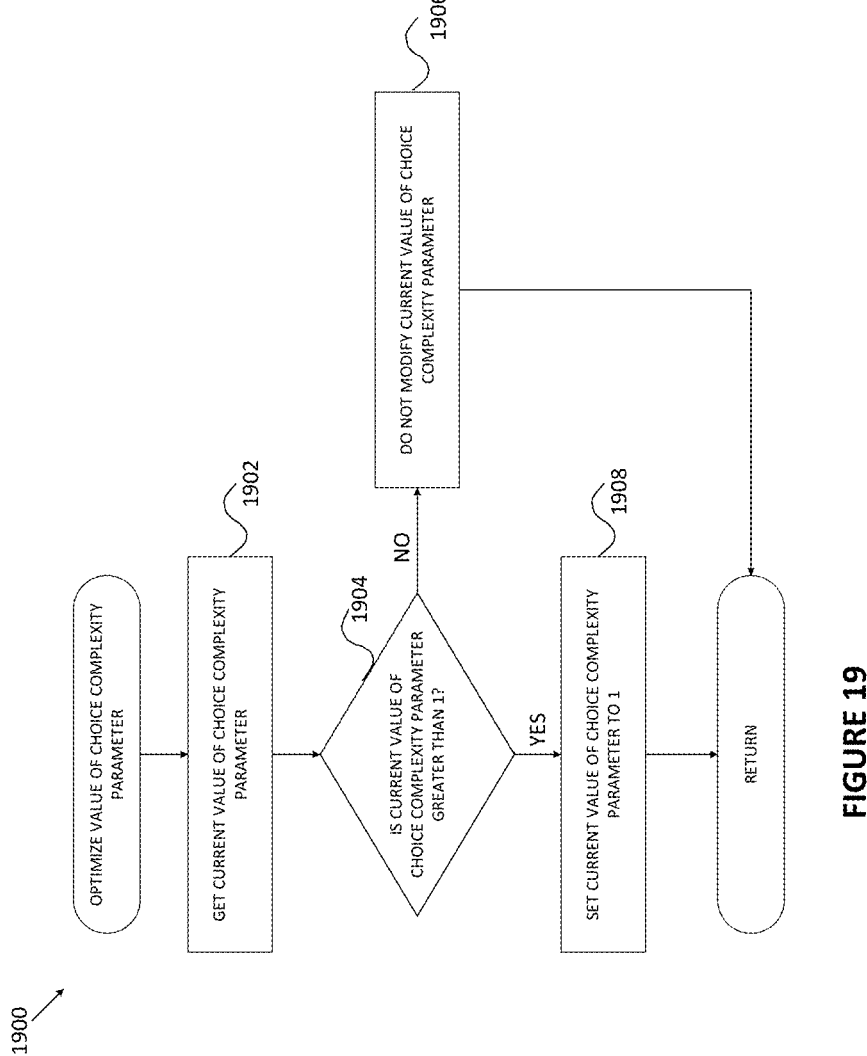

FIG. 19 is a flowchart illustrating an exemplary operation of a subcomponent for optimizing the value of choice complexity parameter by a node, according to some embodiments.

FIG. 20 is a flowchart illustrating an exemplary operation of a subcomponent for optimizing the values of transmission window size and sending rate by a node, according to some embodiments.

Figure 21:
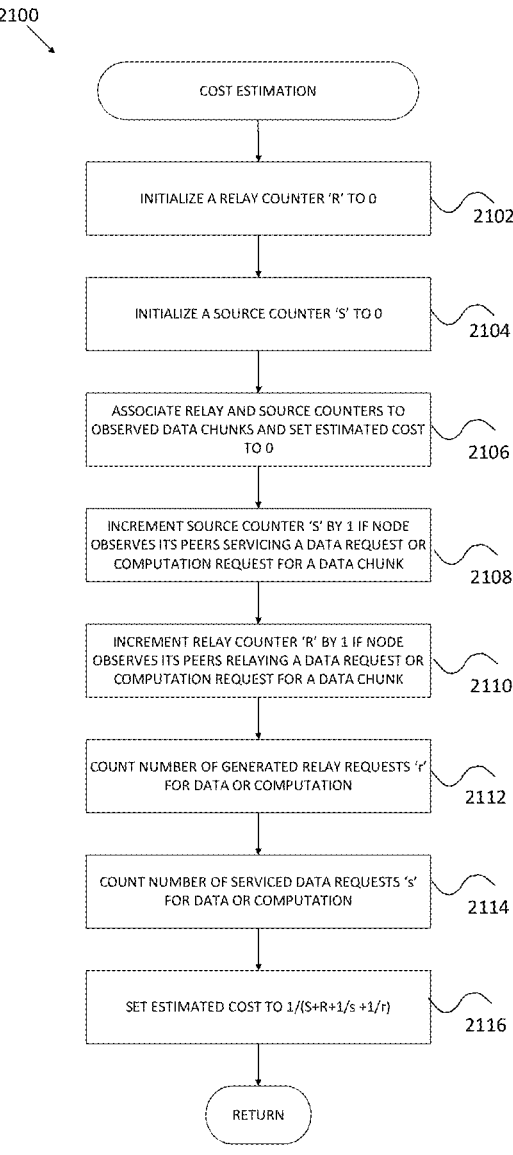

FIG. 21 is a flowchart illustrating an exemplary operation of a subcomponent for estimating service cost by a node, according to some embodiments.

FIG. 22 is a flowchart illustrating an exemplary operation of a subcomponent for performing localized service cover procedure by a node, according to some embodiments.

FIG. 23 illustrates an example process for data transfer and request handling among a plurality of resources, according to some embodiments.

Figure 24:
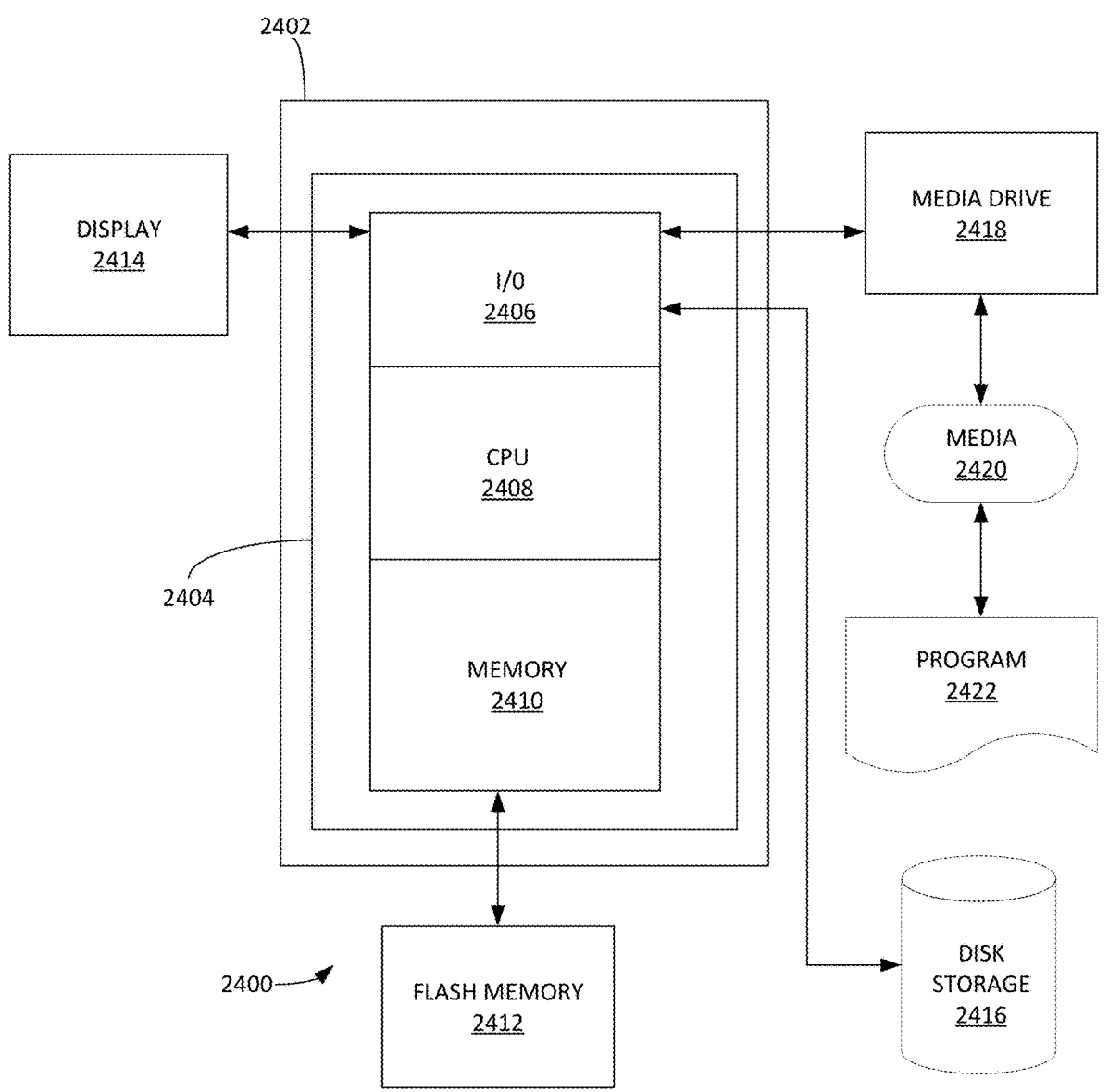

FIG. 24 depicts an exemplary computing system that can be configured to perform any one of the processes provided herein.

The Figures described above are a representative set and are not exhaustive with respect to embodying the invention.

DESCRIPTION

Disclosed are a system, method, and article of manufacture for data transfer and request handling among a plurality of resources. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

The following terminology is used in example embodiments:

A bandwidth-utilization protocol entails that, after a long enough period, the connection capacity will be consumed by senders with no packet loss or increased round-trip.

A cache is a temporary place of storage to save the results of expensive computations or data that is accessed often. This makes it easier and faster to serve requests in the future.

Channel capacity (bits per second), denoted by C, is a general theoretic metric that quantifies how much information can be transmitted in a wireless communication channel. Implementation and standard decisions have a considerable impact on channel capacity. Each digital standard addresses capacity deployment and optimization in a unique way. Data coding parameters, channel width, and time slots limit the majority of systems. CDMA systems, for example, are interference limited and have capacity and coverage trade-offs.

A content distribution network, or CDN, is a system of servers located in multiple locations. Images, JavaScript files, videos, and other media are example types of content that CDN servers store in their caches.

The term "sending rate" refers to the speed at which data packets or information are transmitted over an internet network from a source device to a destination device. Typically measured in bits per second (bps) or packets per second (pps), it quantifies the rate or frequency of data transfer.

The term 'transmission window size' refers to the maximum number of data packets that can be sent without requiring an acknowledgment from the receiving device, thereby optimizing network performance by minimizing the overhead associated with acknowledgment messages. This parameter determines the maximum quantity of data that can be transmitted in a single batch, thereby optimizing the efficiency and throughput of data transmission in a networked environment.

A payload buffer is a temporary storage area in a network device where data packets are held prior to transmission or processing, allowing for the efficient administration and control of network traffic flow. The payload buffer enables seamless data delivery by temporarily storing the actual content (payload) of network packets, thereby optimizing transmission rates and decreasing latency.

Control theory is a field of control engineering and applied mathematics that deals with the control of dynamical systems in engineered processes and machines. The objective is to develop a model or algorithm governing the application of system inputs to drive the system to a desired state, while minimizing any delay, overshoot, or steady-state error and ensuring a level of control stability; often with the aim to achieve a degree of optimality. To do this, a controller with the requisite corrective behavior is required. This controller monitors the controlled process variable (PV) and compares it with the reference or set point (SP). The difference between actual and desired value of the process variable, called the error signal, or SP-PV error, is applied as feedback to generate a control action to bring the controlled process variable to the same value as the set point.

Convergent messaging protocol necessitates that, from some point on, all senders in the network have their transmission window sizes within $(1-\lambda)\times100$ percent of a stability point. For example, convergent messaging protocol with $\lambda=0.75$ indicates that from some point onwards, the transmission window sizes are within 25 percent of the stability point. The value of $\lambda$ lies between 0 and 1.

Efficient messaging protocol ensures that, from some point on, all senders in the network have at least $\lambda C$ capacity, for some value $\lambda$ that lies between 0 and 1.

A fair messaging protocol requires that, from some point forward, the average window size of any sender be at least $\lambda$-fraction of the average window size of every other sender. Fairness and TCP friendliness are attributes that are related. They differ in that fairness is applied to many instances of the same protocol, whereas TCP-friendliness is applied to interactions between different protocols. The value of $\lambda$ lies between 0 and 1.

Game theory is the study of mathematical models of strategic interactions among rational agents.

A load balancer is a device that distributes incoming requests fairly across a group of servers.

A loss avoiding protocol entails that, from some point onwards, the loss rate of senders is bounded by $\lambda$. For example, $\lambda=0.05$ translates to not exceeding loss rate of 5%. The value of $\lambda$ lies between 0 and 1.

A message buffer or queue is a durable component that is held in memory and enables asynchronous communication.

Network Interface Card (NIC) connects networking devices to share data over the network. It supports I/O interrupt, Direct memory Access (DMA), partitioning, and data transmission.

Queueing theory is the mathematical study of waiting lines, or queues. A queueing model is constructed so that queue lengths and waiting time can be predicted. Queueing theory is generally considered a branch of operations research because the results are often used when making business decisions about the resources needed to provide a service.

A robust protocol entails that, from some point onwards, the loss of rate of at most $\lambda$ due to non-congestion related issues, does not prevent utilization of spare network capacity. The value of $\lambda$ lies between 0 and 1.

Round-trip time (RTT) is the total time taken for a network request to go from a sender to the destination and back again to the sender.

TCP-friendly messaging protocol P requires that, from some point on, the average sending window size of senders following the TCP protocol be at least $\lambda$-fraction of the average sending window size of senders following the protocol P. The value of $\lambda$ lies between 0 and 1.

These definitions are provided by way of example and not of limitation. They can be integrated into various example embodiments discussed infra.

Example Systems and Methods

Example systems provide a distributed dynamic input-output model having an iterative equilibrium solution, the complex relationships (e.g. tensions/trade-offs, etc.) between the components affecting the behaviors of various criteria are represented. These example systems are based in part on the placement and transmission control of data packets in a network, at a continually revised optimal rate that has been precomputed by nodes simultaneously, completely acting based only on their local information.

The present invention is a novel control technique that produces desired results for the key network performance indicators. Historically, as previously mentioned, there have been no solutions to the integrated problem of optimal data placement, caching and relaying, congestion control, TCP friendliness, fairness to competing data flows, rapid utilization of spare bandwidth, rapid convergence to stable sending rate, etc.

In actuality, the only consistent approach to cope with all degrees of inefficiency, network underutilization and topological variations, data losses, suboptimal data placement, unfairness toward competing flows, TCP-unfriendliness, and excessive latencies is to model a dynamic interaction model that takes a choice complexity trade-off parameter.

The present invention is based on a dynamic interaction model that employs a choice complexity trade-off parameter to manage all levels of joint caching, relaying, computation, and congestion control. This trade-off parameter can be user- or machine-specified, and it can fluctuate in real time. In general, the present invention optimizes the injection, placement, and caching of data packets and computation policies into the network, in accordance with a precomputed optimal mode of operation that is continually refined.

The present invention, in an exemplary embodiment, offers a novel networking caching, relaying, computation, and congestion control approach that can be implemented in a variety of hardware, firmware, or software configurations (or a mix thereof). The related software or firmware may be distributed as a computer program product that includes computer-readable media containing instructions that, when read, cause an electronic device to carry out a method or technique. Floppy diskettes, optical disks, CD-ROMs, EPROMs, ROMs, EEPROMs, magnetic or optical cards, flash memory, and other computer-readable media may be used. Furthermore, the software may be downloaded as a computer program product, in which the program is transmitted from a remote computer (or electronic device) to a requesting computer via data signals included in a carrier wave or other propagation medium transmitted via a communication link (e.g., a modem or communication link). Consequently, a carrier wave is regarded as a computer-readable medium.

Exemplary embodiments shown and described in FIGS. 1 through 4, referenced below, will assist in understanding the following discussion. With reference to an exemplary embodiment shown in FIG. 4, various nodes 402 are connected via a data channel such as an inter-network connection or over the internet 408 or a direct connection 416.

Figure 3:
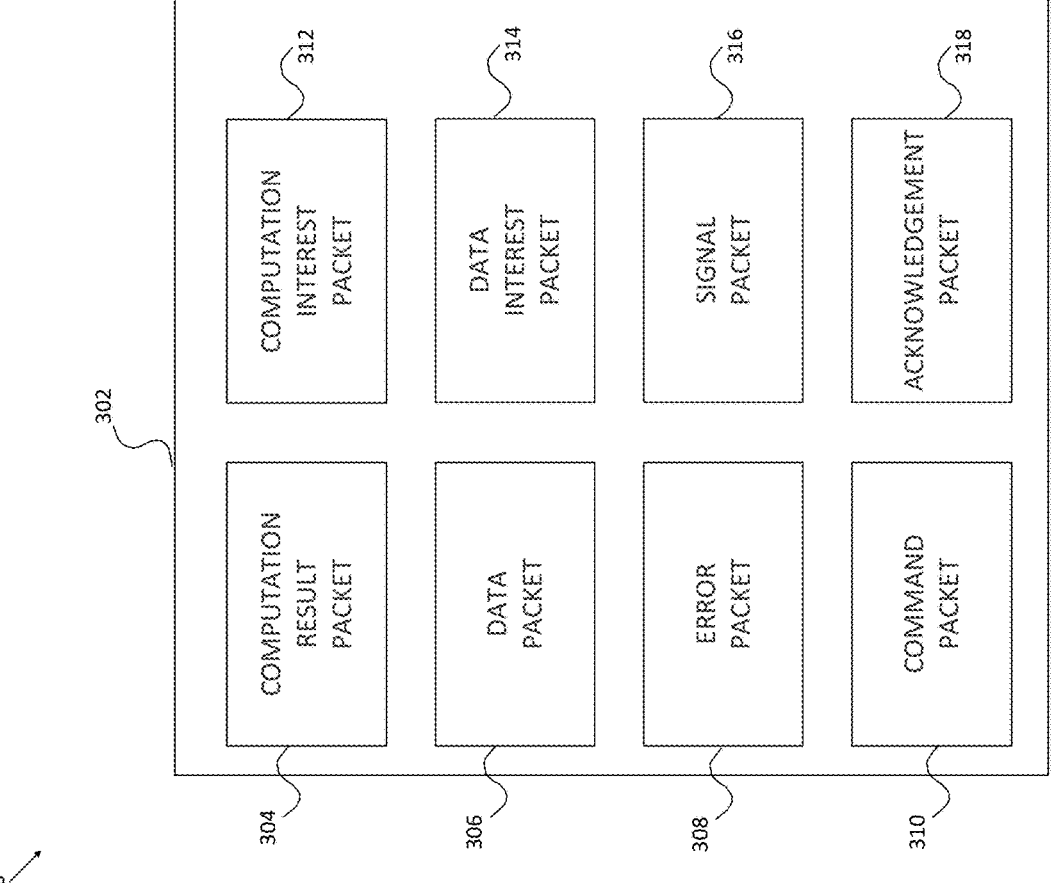
FIG. 3 is a block diagram illustrating the many types of communication packets between network nodes, according to some embodiments.
Figure 4:
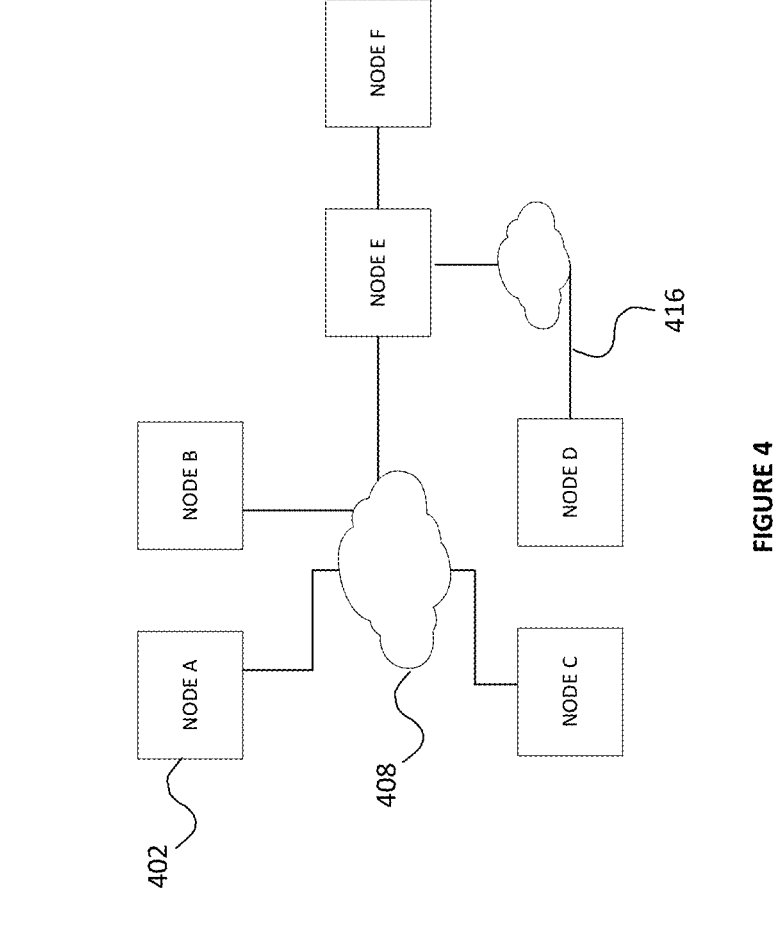
FIG. 4 is an exemplary schematic of nodes in an inter-networked environment, according to some embodiments.

Any node 402 can initiate and process a request for computation, data, caching, and relaying in a data-oriented distributed computing network with arbitrary topology (such as edge computing, cloud computing, peer-to-peer computing, IoT, telecommunication networks, etc.). Any node may send, produce, receive, and process packets. FIG. 3 is a block diagram illustrating an exemplary collection of various types of packets, described in detail later.

With reference to an exemplary embodiment shown in FIG. 1, each node has a main controller 112 with exclusive access to NIC 104. Parts of the NIC 104 can also be controlled with other tools to configure packet filtering or queue sizes. This design lends to a far better integration of the various clients (e.g., application programs) 120 that may reside inside a node with the main controller 112. A node receives and sends various packets, types of those illustrated in FIG. 3. 102 and 116 are denotive of various received packets and sent packets respectively.

The main controller initializes a NIC device 104 by its PCI (or PCIe) address and exposes different device-specific data structures to various clients (e.g., application programs) 120 interacting with it, including packet reception, transfer, NIC device statistics, etc. The NIC device 104 can initiate a Direct Memory Access (DMA) to access any main memory location, or the main controller 112 can initiate access to the Base Address Registers (BARs) of the NIC device 104. The device employs BARs to make configuration and control registers accessible to the main controller 112. These registers are often accessible using PCIe's memory-mapped IO (MMIO). A memory space is mapped to NIC device IO through MMIO. In other words, reading from or writing to this memory space will read from or write to the NIC device, respectively. Through this interface, NIC devices 104 provide their configuration registers, which are accessible using standard reads and writes. Through the memory-mapped IO BAR 106 address space, the main controller 112 has access to all configuration, statistics, and debugging registers for NIC devices.

The NIC device 104 initiates DMA 108, which gives it access to read/write any physical address. The main controller 112 and NIC device 104 use this to access packet data 110 and send pointers to packet data. In one illustrative implementation, high-speed packet IO DMA accesses are made to the CPU cache rather than memory. The main controller 112 manages all memory allocation necessary for IO processing. A main controller component that will be covered in more depth later manages memory allocation and per-packet overhead cost minimization.

To transmit and receive packets, NIC device 104 can contain one or more circular buffers called queues. On the NIC device 104, a number of transmit queues can be combined, and incoming traffic can be divided using filters or a hashing method if a plurality of receive queues are configured. Receive and transmit queues function in similar ways. The main controller 112 configures a physical base address and the queue size. It then populates the memory space with pointers to physical addresses where packet data and metadata are stored 108. Packets are sent and received by passing ownership between the main controller 112 and the NIC device 104 via a head and a tail pointer. The head is controlled by the NIC device 104, whereas the tail is controlled by the main controller 112. Both pointers are kept in device registers that can be accessed via memory mapped IO 106.

The main controller 112 initially fills the circular buffer with physical pointers to packet buffers in order to receive packets. Upon receiving a packet, the associated circular buffer is accessed, and a new packet buffer is allocated, with its physical address saved in the DMA 108 descriptor.

The main controller examines a flag set by the NIC device 104 after the packet associated with its DMA 108 descriptor is sent out, when sending packets. Sent packet buffers can then be freed to make room in the circular queue. Following that, the packet pointers to be transferred are put in the DMA 108 descriptors, and the tail pointer is changed accordingly.

Each successful transmit or receive transaction necessitates an update to the NIC device's 104 tail pointer register, which is a time-consuming procedure that can degrade performance. This and other actions may increase per packet overhead costs, therefore an admission controller 220 inside the main controller handles operations like batching and offloading, etc., which is discussed in detail later, to minimize such operational costs.

Figure 2:
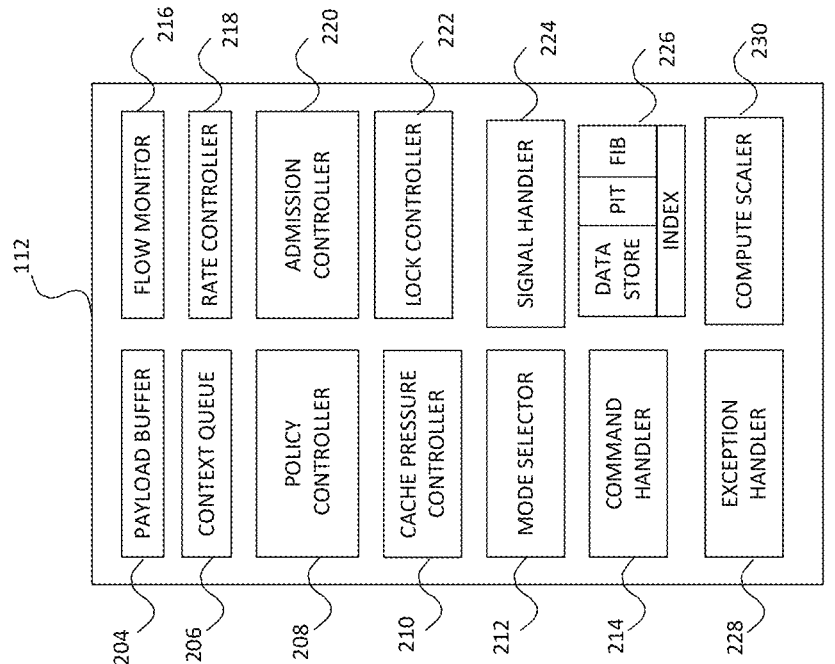
FIG. 2 shows a schematic illustration of the main controller that each node uses to process packets, according to some embodiments.

FIG. 2 presents a diagrammatic illustration of one exemplary architecture of the main controller. The main controller 112 may include a number of receiving threads (or worker threads) while receiving or transmitting packets. When packets are received, their payloads are placed per flow into a circular payload buffer 204, which notifies a suitable context queue 206 by identifying the connection and number of bytes received. Using socket calls, numerous clients (e.g., application programs) 120 (from FIG. 1) can poll for the payload and transfer received data from the payload buffer 204.

TCP manages the flow of packets into payload buffers using a per-connection window size. When a payload buffer is full, the packets are simply dropped. When a context queue 206 is full, the main controller alerts clients (e.g., application programs) 120 upon the arrival of subsequent packets that the queue is once again accessible.

Optionally, when receiving, the main controller 202 can construct an acknowledgement packet and send it to the sender in order to update the sender's TCP window. The acknowledgement packets may also contain explicit congestion notification (ECN) feedback and accurate TCP timestamps for estimate of round-trip time (RTT). Additionally, the main controller 112 can modify its local per-connection state that is managed by flow monitor component 216. FIG. 6 shows a diagrammatic representation of an exemplary per-connection state information 602 that may be maintained and managed locally by flow monitor component 216.

Data is added to the transmit payload buffer 204 of a flow before sending it. A send command causes the context queue 206 to be activated, and the data to be delivered is loaded into a per-flow payload buffer. Depending on the configured rate controller 218 managed by the flow monitor 216, the payload buffers are drained asynchronously. When data needs to be sent, the transmit payload buffer is fetched with the required amount of data, TCP segments and packet headers are created for connections, and then the packets are transmitted. The rate controller 218 is controlled by the flow monitor 216 for congestion control and time outs using pertinent flow information such as TCP timestamps, sent bytes, and feedback from the mode selector 212.

The payload buffers 204 used for sending or receiving may be per-flow or shared. However, it is desirable to use per-flow payload buffers because they simplify packet handling, flow control, and improve isolation. With shared buffers comes the additional cost of per-packet overhead due to iteration over all connections sharing the buffer and calculating accurate flow control window.

Any payload that has been sent remains in the transmit payload buffer until acknowledged by the receiver. The flow monitor 216 parses incoming acknowledgements, updates per-flow sequence and window state, frees acknowledged transmit payload buffer space, obtains the operating mode information from the mode selector 212 and registers the number of transmitted bytes or the corresponding flow on the context queue. To carry out these tasks, the flow monitor 216 maintains a per-flow state information 602 (FIG. 6). Per-flow state information is the specific data and context that network transmission protocols keep track of for each network flow. This includes information like source and destination addresses, port numbers, protocol states, TCP timestamps, and other parameters 602 (FIG. 6), which make it possible to manage and process network traffic in an efficient and targeted way.

The per-flow state information can be accessed by all components of the main controller 112 via shared memory. In one preferred embodiment, storing around 100 bytes of per-flow state information on commodity servers with about 2 MB of L2 caches per General purpose CPU or GPU core, helps in processing 20,000 flows per General purpose CPU or GPU core.

In one preferred embodiment, connection specific context queues (per thread) are allocated by the main controller 202 for scalability, instead of using a number of shared payload buffers and context queues.

In another embodiment, a lock controller 222 can create threads for configured maximum number of general-purpose CPU or GPU cores and assign NIC circular queues to all general-purpose CPU or GPU cores. General purpose CPU or GPU cores that do not receive any packets automatically block and are de-scheduled.

In another embodiment, a lock controller 222 assigns a per-connection spinlock protecting the connection state. The lock controller 222 handles distribution and lazy coordination between various threads operating on context queues to reduce latency due to lock contention. The primary goal of lock controller 222 is to avoid the need for expensive coordination and draining queues when adding or removing general purpose CPU or GPU cores or threads by the compute scaler 230. It asynchronously updates NIC devices and route packets to and away from a specific general-purpose CPU or GPU core (e.g., a general-purpose CPU or GPU core refers to a computational/processing unit within a computer system designed to execute a wide range of instructions and perform various computational tasks. These general-purpose CPUs and/or GPUs can also be combined into highly parallel computing devices to accelerate computational tasks). The lock controller 222 eagerly updates the receive context queues and lazily updates the transmit context queues for outgoing packets. The compute scaler 230 is primarily responsible for workload scalability and continuously monitors the CPU utilization to decide when to add or remove General purpose CPU or GPU cores and limit threads, etc. For instance, it may decide to remove a general-purpose CPU or GPU core if it detects that more than 1.37 General purpose CPU or GPU cores are idle on average; or add a general-purpose CPU or GPU core if it detects less than 0.36 general purpose CPU or GPU cores are idle on average.

The command handler 214 may act upon various commands delegated by the signal handler or exception handler and may also handle dedicated hardware loading and unloading, for transmission handling of the node, etc.

The admission controller 220 is mainly responsible for reducing various overhead costs arising due to suboptimal packet scheduling, lock contention, etc., and maximize the number of packets handled per second. It utilizes lock controller 222 and cache pressure controller 210 to reduce per packet overhead and packet flow processing costs. For example, when the incoming flow of data and interest packets is very huge, a large amount of processing power is wasted to handle the cache misses arising due to suboptimal matching between various packets and their corresponding flows. The cache pressure controller 210 handles the cache management by only clearing received acknowledgements from the context queue in batches and allowing packet flows to add packets to the front of the context queue to avoid unnecessary drops and additions of packets.

Operation 900 (of FIG. 9) illustrates an exemplary operation of admission controller. 902 tunes the packet sizes, 904 paces the flow of packets by controlling the inter-packet gap, 906 reduces cache misses and increases CPU utilization by switching between batching for short packet flows and eagerly processing for large packet flows.

1000 (of FIG. 10) illustrates an exemplary operation of lock controller. 1002 assigns various packets to independent processing queues and regulates access to payload buffers, transmission window size, etc. 1004 performs lazy coordination between independent queues to make the packet flows more amenable to batch processing.

Exceptions arising from unidentified connections, corrupted packets, out-of-order arrivals, and packets with unhandled flags are filtered and policy decisions and management mechanisms such as retransmission timeouts, ACK, and ECN-marked bytes, etc., are applied by the exception handler 228.

1100 (of FIG. 11) illustrates an exemplary operation of the exception handler. 1102 detects out of order arrivals of packets from the flows and matches them against expected sequence numbers based on per flow state. 1104 increments a retransmission counter to decrease sending rate limit upon detecting multiple duplicates of incoming acknowledgement (ACK) packets. 1106 populates the payload buffer with gaps in between packets in a flow to make room for delayed reception of out of order packets. 1108 drops out of order packets if the gaps are left unfilled for a specific time period or the buffer is full. 1110 raises a suitable signal for issues like corrupted flags, unidentified connections, packet flows, etc., and offloads their handling to signal handler 224.

1200 (FIG. 12) illustrates an exemplary operation of the signal handler. The signal handler implements all policy and signal handling procedures such as timeouts, raised exceptions, etc., according to specified rule sets (provided, for example, by a network or organizational policy, etc.) 1202. 1204 may optionally relay context information such as local network topological information to peers, beacon signals, signals inviting computation and data requests, signals commanding other peers to go into a specific mode of operation, etc.

Operation 1300 (of FIG. 13) illustrates an exemplary operation of the compute scaler. The compute scaler may monitor CPU utilization and dynamically add or remove general purpose CPU or GPU cores 1302. 1304 may direct packets to suitable General purpose CPU or GPU cores using hardware or software packet steering methods 1304. 1306 may block worker threads or general-purpose CPU or GPU cores when no packets exist to process and wake up general purpose CPU or GPU cores or threads when necessary. 1306 may optionally offload computation dynamically to external hardware for network processing.

Figure 5:
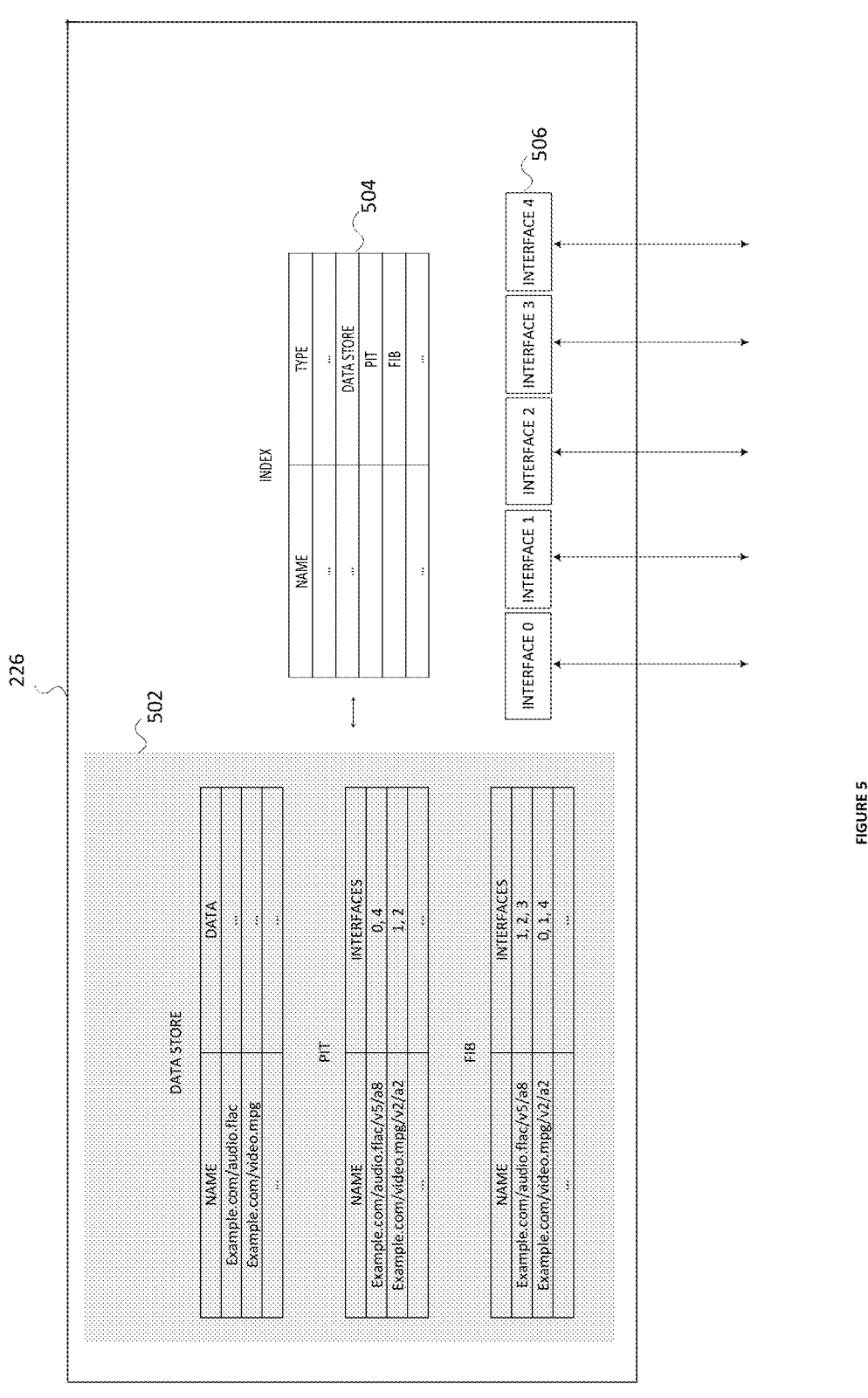
FIG. 5 is an exemplary schematic of the data storage, forwarding and index table inside a node in a CCN setting, according to some embodiments.

The data store, forwarding and indexing component 226 pertaining to a CCN setting may reside within the main controller, whose typical operation is described in the background section above. FIG. 5 presents a diagrammatic representation of a data storage, forwarding and indexing information residing in a CCN node.

The mode selector 212 calibrates the sending rate, transmission window size, payload buffer size, etc., based on a given choice complexity parameter that optimizes for high throughput, loss avoidance and low latency. FIG. 7 shows a flowchart illustrating the overall operation of the mode selector component 212 (from FIG. 2). Because of the inherent trade-off between three modes of operation: high throughput, high loss avoidance rate and low latency transmission, the mode selector requires an initial choice complexity parameter value 702, to decide optimal mode of operation and prescribe optimal transmission window and payload buffer sizes, sending rate, etc.

The initial choice complexity parameter value can be user specified or automatically generated on the node randomly. In one preferred embodiment, the value lies between 0 and 1. A value of 1 signifies high throughput, high loss avoidance and high latency mode. A value of 0 signifies a low throughput, high loss avoidance and low latency mode. After measuring some network transmission metrics 704 like round trip time (RTT), loss rate, sending rate and channel capacity (both current and historical, for a specific time window), the mode selector performs a series of calibrations (steps 706, 708, 710, 712 and 714) to optimize for high efficiency, low latency, high loss avoidance, convergence, and robustness respectively, and calibrates the choice complexity value 716 to achieve optimal throughput, latency, and TCP-friendliness. Based on the calibrated value of choice complexity parameter, optimal transmission window size, sending rate, etc., are prescribed 718. FIGS. 14, 15, 16, 17 and 18 show flowcharts illustrating sub-operations for exemplary calibration steps 706, 708, 710, 712 and 714 respectively. FIGS. 19 and 20 show flowcharts illustrating various sub-operations for steps 716 and 718 respectively. Each of these sub-operations are described in detail below.

FIG. 14 illustrates a flowchart depicting the efficiency calibration procedure (706 from FIG. 7). In step 1402 the current choice complexity parameter is obtained, and an accumulator value is instantiated to zero. The initial choice complexity parameter value may be user provided or auto generated. In step 1404 a timestamp variable T is set to the beginning of transmission time of node and is incremented by 1 (i.e., for each successive timestamp until present time)

for subsequent processing. At steps 1406, a variable called scaling value is instantiated to 1.

Step 1408 retrieves the transmission metrics such as round-trip time, sending rate and channel capacity at that point of time denoted by T. 1410 computes the ratio of sending rate at time point T to channel capacity at time point T and checks if it is less than 1. If the ratio is less than 1, the scaling value is set to the value of that ratio 1414. Else, it is set to 1 (1412). At timepoint T, multiply the scaling value to round trip time 1416 and add accumulator 1420. The incrementing of timestamp T and a check to see if it is greater than the current timestamp is performed by steps 1418 and 1422 respectively.

At current timestamp, 1426 computes ratio of accumulator to average round trip time. 1428 checks if the ratio of accumulator to average round trip time is less than 1. If true, then the choice complexity value parameter is set to this ratio 1432 and saved to memory and the procedure returns back. Else, the unmodified choice complexity parameter value is returned back 1430. The goal of this procedure 1400 (FIG. 14) is to tune the choice complexity parameter value to achieve optimal transmission efficiency.

FIG. 15 illustrates a flowchart depicting the efficiency calibration procedure (708 from FIG. 7). In step 1502 the current choice complexity parameter is retrieved, and an accumulator value is instantiated to zero. The initial choice complexity parameter value may be user provided or auto generated, if not already present in memory. In step 1504 a timestamp variable T is set to the beginning of transmission time of node and is incremented by 1 (i.e., for each successive timestamp until present time) for subsequent processing. 1506 obtains the current transmission window size and 1508 obtains round trip time and sending rate at timepoint T. The accumulator is added the value obtained by multiplying sending rate with round trip time at timepoint T 1510. The incrementing of timepoint T is performed by 1512 and 1514 checks to see if T is greater than the current timestamp. At current timestamp, 1516 compute the average sending rate from beginning timepoint. 1518 computes the ratio of accumulator to average sending rate. 1520 computes an intermediate value (stored in variable TEMP) that is equal to twice the current transmission window size multiplied with choice complexity parameter value. 1522 checks to see if ratio of accumulator to average sending rate is less than the intermediate value. If true, the choice complexity parameter is set to 1−current choice complexity parameter value and saved to memory and the procedure return back 1526. Else, the choice complexity parameter value is left unmodified, and the procedure returns back 1524. The goal of this procedure 1500 (FIG. 15) is to tune the choice complexity parameter value to avoid high transmission latency.

FIG. 16 illustrates a flowchart depicting the loss avoidance (due to non-congestion related factors) calibration procedure (710 from FIG. 7). In step 1602 the current choice complexity parameter is retrieved, and an accumulator value is instantiated to zero. The initial choice complexity parameter value may be user provided or auto generated, if not already present in memory. In step 1604 a timestamp variable T is set to the beginning of transmission time of node and is incremented by 1 (i.e., for each successive timestamp until present time) for subsequent processing. 1606 measures the loss and sending rates at timepoint T. 1608 adds to accumulator the value obtained by multiplying loss rate with sending rate at timepoint T. The incrementing of timepoint T is performed by 1610 and 1612 checks to see if T is greater than the current timestamp. If true, the average sending rate from beginning to current timestamp is computed 1614 and

1616 computes the ratio of accumulator to average sending rate. 1618 checks to see if this ratio is less than (1−current choice complexity value). If true, 1622 sets the choice complexity value to (1−current choice complexity value), save it to memory and returns back. Else, the choice complexity parameter value is left unmodified, and the procedure returns back to 1620. The goal of this procedure 1600 (FIG. 16) is to tune the choice complexity parameter value to minimize non-congestion-based losses.

FIG. 17 illustrates a flowchart depicting the convergence calibration procedure (712 from FIG. 7). In step 1702 the current choice complexity parameter is retrieved, and an intermediate value TEMP is instantiated to the retrieved choice complexity parameter. The complexity parameter value may be user specified or autogenerated, if not already present in memory. 1704 sets the choice complexity parameter value to twice the TEMP value divided by (1+TEMP) and the procedure returns back. The goal of this procedure 1700 (FIG. 17) is to tune the choice complexity parameter value to minimize time for transmission convergence. In an alternate embodiment, the process may directly compute the result without requiring an intermediate result like TEMP.

FIG. 18 illustrates a flowchart depicting the convergence calibration procedure (714 from FIG. 7). In step 1802 the current choice complexity parameter is retrieved, and an intermediate value TEMP is instantiated to the retrieved choice complexity parameter. The complexity parameter value may be user specified or autogenerated, if not already present in memory. 1804 sets the choice complexity parameter value to (3−TEMP) divided by (3+TEMP) and the procedure returns back. The goal of this procedure 1800 (of FIG. 18) is to tune the choice complexity parameter value to achieve robustness. In an alternate embodiment, the process may directly compute the result without requiring an intermediate result like TEMP.

After performing steps 702 through 714 (of FIG. 7), the value of choice complexity parameter is normalized 716 to fall within the interval 0 and 1. The suboperations involved in normalization procedure 716 is illustrated in the flowchart 1900 (of FIG. 19). 1902 retrieves the current choice complexity value and 1904 checks if it is greater than 1. If true, the choice complexity value is set to 1, saved to memory and the procedure returns 1908. Else, the value is left unmodified 1906 and the process returns back. A choice complexity value of 1 signifies a high throughput, high loss avoidance rate and low latency transmission mode. A value of 0 indicates low latency, low loss avoidance and low throughput transmission mode. A value in between 0 and 1 indicates an optimal mode for throughput, latency, and loss avoidance. The processes 702 through 714 ensure fairness and TCP-friendliness in their design.

Step 718 (of FIG. 7) prescribes optimal transmission window size and sending rate dynamically to achieve the desiderata. The suboperations involved in this procedure is illustrated by the flowchart 2000 (of FIG. 20). In step 2002, the optimal choice complex parameter value is obtained. 2004 measures current payload buffer size. 2006 measures current transmission window size and channel capacity. A new intermediate variable called 'TEMP is instantiated to the choice complexity parameter value 2008. 2010 computes the optimal sending rate as (channel capacity+payload buffer size)−0.75*(1−TEMP)/(1+TEMP). 2012 computes the optimal transmission window size to be current transmission window size multiplied by TEMP value. The optimal values for transmission window size and sending rate are stored in memory and prescribed to various components (such as rate control 218, etc.) interfacing with the mode selector 212 component.

The policy controller 208 handles how and when the requests for data and computation be performed, relayed, and cached, based on a localized cost estimation procedure. The policy controller adopts a novel randomized and distributed design that can be executed by nodes independently and locally, without requiring global context like network topology, and sending message requests in large volumes to reduce network overhead, etc. The design and operation of 208 is illustrated by flowchart 800 (of FIG. 8). 802 performs a localized cost estimation procedure (i.e., cost to service data requests, cost to compute, cost to cache, etc.). 804 performs a localized service cover operation to decide the affinity of a node to delegate all requests to its peers. 806 decides whether to service a request or to relay all requests it receives. Depending upon the affinity measure computed by 804, a node may choose to relay data and computation requests to a chosen peer 808 or it may decide to service the data or computation request 810, cache the obtained computation result or data 812, and relay a cache request to its peers to cache the data or computation result to maximize accessibility and reduce latency for further requests 814.

The suboperations involved in steps 802 and 804 are presented in flowcharts 2100 (of FIG. 21) and 2200 (of FIG. 22) respectively.

2100 (of FIG. 21) illustrates a flowchart depicting an exemplary cost estimation procedure 802 (of FIG. 8). Each node instantiates two counters relay 'R' and source 'S' to zero (steps 2102 and 2104 respectively). Because data are stored and serviced distributively as chunks across the network, 2106 associates both counters to various data chunks a node observes and sets the estimated cost to 0. Each time a data or computation request is relayed by other peers, the node increments its R counter, corresponding to that data chunk 2110. The counter R is an indicator of the unavailability of content or compute resources in the local neighborhood of the node. Similarly, each time a data or computation request is serviced by other peers, the node increments its S counter, corresponding to that data chunk 2108. The counter S is an indicator of the availability of content or compute resources in the local neighborhood of the node. The node also maintains a count of how many data and computation requests it has relayed to its peers without servicing ('r') 2112 and how many data and computation requests it has serviced ('s') 2114 corresponding to various data chunks. 2116 estimates the total servicing cost to $1/(S+R+1/s+1/r)$. The cost may be dynamically computed and stored in memory.

2200 (of FIG. 22) illustrates a flowchart depicting various suboperations involved in 804 (of FIG. 8). The node initially chooses to belong to a service cover 2202. Belonging to a service cover entails being able to service data or computation requests. 2204 obtains the cost of servicing calculated from step 802. 2206 counts the number of its peers belonging to the service cover. 2208 generates a random profile of its peers indicating service cover participation. For example, denoting a node belonging to service cover by 1 and not belonging to service cover by 0, and considering a set of 5 nodes: 1 1 1 1 1 indicates all nodes belonging to service cover; 1 0 0 0 0 indicates all nodes except the first one not belonging to the service cover, etc. A random profile may look like 10011 or 11001, etc., indicating first, fourth and fifth nodes belonging to service cover in former case; and first, second and fifth nodes belonging to service cover in the latter. 2208 generates such random profiles for its peers while assuming it does not belong to service cover. Similarly, 2210 generates various random profiles that assumes that the node belongs to the service cover. 2212 computes the total cost for each of these profiles using a method similar to 802. The cost computation resets various relay and source counters according to the random profile, instead of using observed values. 2214 chooses the profile with minimum cost value. 2216 removes the node from service cover (i.e., de-identifies it as not belonging to the service cover) if the chosen profile does not contain the node.

After performing localized computations 802 and 804, step 806 checks if node has identified itself belonging to the service cover. If true, the node handles the incoming data or computation requests 810 and caches the computation result or requested data for future requests. Subsequently, it relays a caching request to its peers that belong to the service cover to store the data for improved accessibility and availability. In instances where the node belongs to the service cover, but has limited computation resources to process the request, it checks to see if any of its computational resources will be available for processing, within a specific time window, and assigns the compute resources to the task once they are available. In the meantime, it places the computation request in the context queue 206 (of FIG. 2). If the compute resources are inadequate to the request on hand, the request is relayed to a random peer belonging to service cover. In another embodiment, the node and its peers may adopt a master-slave architecture to jointly process the computation request. In another embodiment, while caching the data 812, an eviction policy may control what data chunks to remove before adding others. In one embodiment, data chunks may be assigned a time to live (TTL) that periodically decreases and each time a data chunk is referred to, its TTL is increased. Data chunks whose TTL reaches zero are evicted from the cache. In an alternate embodiment, each node may decide to only cache the data chunks requested by its peers. Other alternative caching policies like least recently used (LRU), last-in-first-out (LIFO), etc., may also be employed.

When it is decided that the node doesn't identify itself belonging to the service cover, it relays all data and computation requests to its peers 808. In one embodiment, the node may choose one or a plurality of peers at random and relay the requests. In another embodiment, the requests may be relayed to peers that may proactively seek computation and data requests, etc.

A small example use-case of the invention explaining the utility and principle of operation is described below.

A node may receive 102 and send 116 various kinds of packets. 302 illustrates a block diagram of an exemplary list of types of incoming packets. A node can choose to relay all kinds of packets 302; service 312 and 314; generate all kinds of packets 302; cache 306 and 304; send transmission packets like acknowledgements (ACK), error packets (ERR), signal packets (ECN), command packets (STOP), etc. A node may also place requests to its peers to append data, insert data and wait for data asynchronously using various signals like APPEND, INSERT, WAIT, etc.

A node can be the source of a data chunk and has a finite amount of memory (cache) and compute resources (processor). When a node decided to locally service a computation request form a client, it checks to see if it is the source of the data chunk to computed upon. If the data chunk is not cached, it may generate a data interest packet and send it to its peers. The peers respond with the desired data and the node may cache the data, perform the computation, and send the computation result to client. It may optionally cache the computational result based on caching policy. On the other hand, if the node decides to service a computation request remotely, it relays the computation interest packet to its peers in the service area, gets back the computation result packets, may optionally cache them, and send to the client.

At each time point, each node may transmit various kinds of packets via outgoing links 116 with sending rates and transmission window sizes that are dynamically optimized by the mode selector.

FIG. 5 illustrates an exemplary architecture of data storage and forwarding in a node. Content delivery in CCN is accomplished using a set of data packets and data structures on a node. Communication in CCN is destination driven, i.e., the data consumer. Two distinct types of packets exist in CCN: interest packets and data packets. Both carry a name, uniquely identifying a piece of content that can be carried in one data packet. To receive data, a consumer sends an interest packet carrying a name that identifies desired data.

Data packets passing through a node are temporarily buffered by a data store, and pending interest packets currently awaiting matching data are recorded in a pending interest table (PIT). PIT entries contain one or more incoming and outgoing physical interfaces. Multiple incoming interfaces indicate multiple downstream consumers are requesting the same data. There can be a plurality of outgoing interfaces, indicating that interest packets are sent in several directions. Additionally, each node has a forwarding information base (FIB), which matches prefixes of names with physical network interfaces, specifying where interest packets should be relayed.

A CCN node/router consults its data store, PIT, and FIB 502 (FIG. 5) using an index table 504 in that order when an interest packet arrives. In the first step, the router/node checks whether the requested data is already present in its data store, which is populated by its cache replacement policy. The router/node checks whether the PIT includes the same interest if there is no match. Each entry in PIT contains the name of the interest and a list of interfaces 506 that have received interest packets. The router/node adds the interest incoming to the corresponding entry of PIT if PIT contains the same interest. By looking up the name of the interface in its FIB, which is populated by a name-based routing protocol, the router/node relays the interest packet.

When the interest reaches a node containing the requested data, a data packet containing both the name and content of the data is sent back. This packet is signed by the producer's key. This data packet traces the reverse path created by the interest packet back to the consumer. When a data packet is received, its name is looked up in PIT. Once a matching entry has been found, the router/node sends the packet to the interface that received the interest. Optionally, it caches the data and removes the entry from the PIT. Otherwise, the data packet is considered unsolicited and is discarded. In addition, each interest packet has an associated lifetime, and the PIT entry is removed once that lifetime has expired.

Although managing data placement, requests across nodes, and congestion control would be difficult enough for information-centric networking architectures like CCN (e.g., networks of IoT, networks of mobile devices interconnected with autonomous driving cars, etc.), major disruptions come from the network's constantly changing topology, the availability of computing resources, the demand for data from multiple nodes, etc. These schemes effectively optimize for equitability in a CCN setting, and efficiency and equitability in a client-server setting, but leave accessibility out of the equation. Other prior art schemes have addressed this compound problem by identifying and taking advantage of multiple transmission paths to the receiving node and distributing the transmission among those paths. These however offer marginal latency benefits while adversely impacting equitability among competing flows and energy consumption.

Most conventional relaying and cache management solutions may not be effective for CCN because efficient and delay-sensitive computing and data needs necessitate optimizing storage, computation, and bandwidth. More importantly, CCN need to be interoperable with the traditional network setting and traditional TCP protocols, where the intermediate network nodes in ad hoc wireless environments, for example, routers and switches, adopt the store-and-relay strategy.

Caching replicated data is a general approach used to reduce both network traffic and overloaded servers or nodes. Multiple nodes or servers can store duplicates of commonly requested documents, effectively distributing the work of serving and processing documents and computing demands. If the cached copy is close to the receiver in terms of network topology, caching can reduce network traffic since fewer network links and resources are required to retrieve the information.

FIG. 23 illustrates an example process 2300 for data transfer and request handling among a plurality of resources, according to some embodiments. Process 2300 can be integrated in whole and/or part in various example embodiments provided herein. The trade-offs between various desiderata have been combined into one overall optimization program/dynamic model. In step 2302, process 2300 can implement components 208 and 212 (of FIG. 2) and their operation. In step 2304, process 2300 can implement communication and data caching and relaying protocol ensures high availability, accessibility, equitability, and efficiency among network resources. In step 2306, process 2300 can offer a generalized treatment to different choices made for some components of the optimal data placement, transfer, and request handling problem. In step 2308, process 2300 can enable a node to independently decide what data to cache, and for how long, based on a dynamic estimate of content and compute resource presence among its peers. In step 2310, process 2300 can cache and relay packets in a manner that does not require calculation of expensive functions. In step 2312, process 2300 can leverage principles from game theory, queuing theory and control theory to formulate an elegant solution to a difficult problem. Process 2300 can use other types of resource allocation problems, such as those arising in autonomous driving, can also be solved using our approach. Process 2300 can be immune to starvation, an extreme form of unfairness. Process 2300 can automatically create content and compute diversity to avoid flooding the network with messages in step 2314. Process 2300 can offer a single objective function for optimization that is easily computable even by nodes with low processing power and can operate completely using only local information (e.g. in a fully decentralized manner).

Process 2300 can provide an independent of the underlying nature of network architecture (wired, wireless, satellite, etc.). Process 2300 can also be packaged as a data transmission acceleration service for data centers, CDNs, etc. Process 2300 can automatically update to newer versions of data to avoid stale data problems (e.g. it achieves eventual data consistency with zero control overhead). It is noted that process 2300) can co-exist with legacy TCP protocols (e.g. stock TCP stack in Operating Systems, etc.).

Process 2300 (and/or the various other processes provided herein) can be workload proportional and scales according to demand. It can also be tuned to specific requirements such as part latency optimization and part transmission and computation cost reduction, etc. Process 2300 can enable nodes to offload various computations involved in the method to dedicated hardware, executed in user-space and/or OS kernel bypass modules, etc. in step 2316. However, one of the implementational advantages is that process 2300 does not necessitate modification of OS kernel, thus saving a lot of effort.

Both centralized and distributed implementations of our method are possible. Process 2300 recognizes the fact that data transmission, ensuring fairness and other desiderata are achieved by solving a CPU bound problem, formulated as a single (e.g. joint) objective function. Various components and features of the method described can be combined in a variety of ways.

Process 2300 (and/or the various other processes provided herein) have been described with reference to preferred embodiments; nevertheless, it should not be construed as restricted to the specific structure, operation, or embodiments illustrated and described, as obvious variations will be apparent to one skilled in the art.

Additional Computing Systems

FIG. 24 depicts an exemplary computing system 2400 that can be configured to perform any one of the processes provided herein. In this context, computing system 2400 may include, for example, a processor, memory, storage, and I/O devices (e.g. monitor, keyboard, disk drive, Internet connection, etc.). However, computing system 2400 may include circuitry or other specialized hardware for carrying out some or all aspects of the processes. In some operational settings, computing system 2400 may be configured as a system that includes one or more units, each of which is configured to carry out some aspects of the processes either in software, hardware, or some combination thereof.

FIG. 24 depicts computing system 2400 with a number of components that may be used to perform any of the processes described herein. The main system 2402 includes a motherboard 2404 having an I/O section 2406, one or more central processing units (CPU) 2408 and/or graphical processing unit (GPU), and a memory section 2410, which may have a flash memory card 2412 related to it. The I/O section 2406 can be connected to a display 2414, a keyboard and/or another user input (not shown), a disk storage unit 2416, and a media drive unit 2418. The media drive unit 2418 can read/write a computer-readable medium 2420, which can contain programs 2422 and/or databases. Computing system 2400 can include a web browser. Moreover, it is noted that computing system 2400 can be configured to include additional systems in order to fulfill various functionalities. Computing system 2400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g. embodied in a machine-readable medium).

In addition, it can be appreciated that the various operations, processes, and methods disclosed herein can be embodied in a machine-readable medium and/or a machine accessible medium compatible with a data processing system (e.g. a computer system) and can be performed in any order (e.g. including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States patent:

1. A computerized system of main controller that each node uses to process packets comprising:
   the main controller that each node uses to process packets, wherein the main controller comprises a plurality of receiving threads while receiving or transmitting a plurality of packets, and wherein when packets are received, a payload of the packet is placed per flow into a payload buffer, which notifies a suitable context queue by identifying a connection and a number of bytes received, and wherein the main controller further comprises:
   a policy controller configured to handle how and when a request for data and computation is performed, relayed, and cached, based on a localized cost estimation procedure, and
   a mode selector configured to calibrate a sending rate, a transmission window size, and a payload buffer size, based on a given choice complexity parameter that optimizes for a high throughput, a loss avoidance and a low latency,
   wherein the policy controller is further configured to derive the localized cost estimation procedure directly from per-flow payload buffer occupancy and per-flow context queue state maintained within the main controller, and wherein policy decisions are executed inline with packet reception prior to transmission rather than being returned as out-of-band recommendations,
   wherein the main controller performs lazy updates to a transmit context queue based on updates first applied to a received context queue corresponding to the same flow, such that transmit-side scheduling state is deferred until receipt-side processing completes, and
   wherein the policy controller and mode selector operate using only thread-local and node-local state without requiring global network topology, global flow state, or centralized coordination across nodes.

2. The computerized system of claim 1, wherein the policy controller adopts a randomized and distributed design that is executed by a plurality of nodes independently and locally, without requiring global context like network topology.

3. The computerized system of claim 1, wherein the policy controller sends a plurality of message requests to reduce network overhead.

4. The computerized system of claim 1, wherein the main controller uses a plurality of socket calls and a plurality of numerous clients to poll for a payload and a transfer received data from the payload buffer.

5. The computerized system of claim 4, wherein the payload buffer comprises a circular payload buffer.

6. The computerized system of claim 1, wherein the main controller constructs an acknowledgement packet and sends the acknowledgement packet to a sender in order to update a sender's TCP window.

7. The computerized system of claim 1, wherein the sending rate comprises the speed at which a data packet is transmitted over an internet network from a source device to a destination device.

8. The computerized system of claim 7, wherein the transmission window size comprises a maximum number of data packets that can be sent without requiring an acknowledgment from the receiving device, thereby optimizing a network performance by minimizing the overhead associated with acknowledgment messages.

9. The computerized system of claim 8, wherein the payload buffer size comprises a temporary storage area in a network device where one or more data packets are held prior to transmission or processing.

10. The computer system of claim 9 further comprising:
    a flow monitor configured to maintain a per-flow state information, where the per-flow state information can be accessed by a plurality of components of the main controller via a shared memory.

11. The computer system of claim 10, wherein a plurality of connection specific context queues per thread are allocated by the main controller for scalability maintenance.

12. The computer system of claim 11 further comprising:
    a lock controller configured to create threads for a configured maximum number of general-purpose CPU or GPU cores and assign network interface controller (NIC) circular queues to one or more General purpose CPU or GPU cores, and wherein any general-purpose CPU or GPU cores that do not receive any data packets automatically block and are de-scheduled.

13. The computer system of claim 12, wherein the lock controller assigns a per-connection spinlock protecting the connection state handles distribution and lazy coordination between various threads operating on context queues to reduce latency due to lock contention.

14. The computer system of claim 13 further comprising:
    a lock controller configured to update a received context queue and lazily update a transmit context queue for an outgoing data packet, and
    a compute scaler configured to manage a workload scalability and continuously monitor a general-purpose CPU or GPU utilization and to decide when to add or remove a general-purpose CPU or GPU core and limit a thread.

15. The computer system of claim 13 further comprising:
    a command handler configured to:
    act upon a set of commands delegated by a signal handler or an exception handler, and
    handle a dedicated hardware loading and unloading operation and a transmission handling of at least one node.

16. The computer system of claim 13 further comprising:
    an admission controller configured to utilizes a lock controller and a cache pressure controller to reduce a per packet overhead and a packet flow processing cost.

17. The computer system of claim 13 further comprising:
    the cache pressure controller configured to:
    handle the cache management by only clearing a plurality of received acknowledgements from the context queue in batches,
    and allow a plurality of packet flows to add packets to a front of the context queue to avoid unnecessary drops and additions of packets.

18. A computerized system of main controller that each node uses to process packets comprising:
    wherein each software process within a group of independently operating processes in a node may contain an embedded main controller, wherein the main controller enables data transmission across one or more interconnected network segments while adhering to a predetermined protocol, wherein the main controller is configured to process packets, wherein the main controller comprises a plurality of receiving threads while receiving or transmitting a plurality of packets, and wherein when packets are received, a payload of the packet is placed per flow into a payload buffer, which notifies a suitable context queue by identifying a connection and a number of bytes received, and wherein the main controller further comprises:

a policy controller configured to handle how and when a request for data and computation is performed, relayed, and cached, based on a localized cost estimation procedure, and a mode selector configured to calibrate a sending rate, a transmission window size, and a payload buffer size, based on a given choice complexity parameter that optimizes for a high throughput, a loss avoidance and a low latency, wherein the policy controller and mode selector execute control decisions synchronously with packet reception events within the main controller, based on per-flow receive-side payload buffer state, prior to any transmit-side scheduling or forwarding, wherein transmit scheduling parameters are derived from a receive-side context queue associated with a flow and are applied only after receive-side processing completes, such that transmit context state is updated lazily and independently of receive-side lock acquisition, and wherein all control decisions are performed using only node-local and thread-local state, without requiring global network topology information, centralized policy servers, or coordination across multiple nodes.

* * * * *